US009218071B2

(12) United States Patent
Westhues

(10) Patent No.: US 9,218,071 B2
(45) Date of Patent: Dec. 22, 2015

(54) INTERPOLATION OF POSITION OF A STYLUS IN A TOUCH SENSOR

(71) Applicant: Microsoft Corporation, Redmond, WA (US)

(72) Inventor: Jonathan Westhues, Portland, OR (US)

(73) Assignee: MICROSOFT CORPORATION, Redmond, WA (US)

(*) Notice: Subject to any disclaimer, the term of this patent is extended or adjusted under 35 U.S.C. 154(b) by 360 days.

(21) Appl. No.: 13/797,585

(22) Filed: Mar. 12, 2013

(65) Prior Publication Data

US 2013/0278550 A1    Oct. 24, 2013

Related U.S. Application Data

(60) Provisional application No. 61/636,125, filed on Apr. 20, 2012.

(51) Int. Cl.
*G06F 3/0354* (2013.01)
*G06F 3/038* (2013.01)
*G06F 3/044* (2006.01)

(52) U.S. Cl.
CPC .......... *G06F 3/03545* (2013.01); *G06F 3/0383* (2013.01); *G06F 3/0386* (2013.01); *G06F 3/044* (2013.01)

(58) Field of Classification Search
CPC .................................................. G06F 3/03545
USPC ................................................ 345/156–184
See application file for complete search history.

(56) References Cited

U.S. PATENT DOCUMENTS

| | | | |
|---|---|---|---|
| 2004/0113895 A1* | 6/2004 | Lubarsky et al. | 345/174 |
| 2008/0106520 A1* | 5/2008 | Free et al. | 345/173 |
| 2010/0193258 A1 | 8/2010 | Simmons et al. | |
| 2010/0321328 A1* | 12/2010 | Chang et al. | 345/174 |
| 2012/0062497 A1 | 3/2012 | Rebeschi et al. | |
| 2012/0327025 A1 | 12/2012 | Huska et al. | |
| 2013/0027361 A1 | 1/2013 | Perski et al. | |

OTHER PUBLICATIONS

Baharav, et al., "Capacitive Touch Sensing : Signal and Image Processing Algorithms", Retrieved at <<http://www3.ntu.edu.sg/home/ramakrishna/spie2011captouch.pdf>>, In Proceedings of SPIE, vol. 7873, Issue 1, Feb. 2011, pp. 12.

* cited by examiner

*Primary Examiner* — Carolyn R Edwards
(74) *Attorney, Agent, or Firm* — Brandon Roper; Judy Yee; Micky Minhas

(57) ABSTRACT

Systems and methods for determining interpolation functions for a stylus position on a sensor matrix and estimating such a position are provided. In one disclosed embodiment, a test apparatus comprises a stylus configured to be positioned on a sensor matrix at each location of a set of known locations. One or more processors are configured to access the touch sensor data corresponding to the set of known locations, where the data is produced in response to positioning the stylus on the sensor matrix at the set of known locations. Stylus location data reflecting the set of known locations is accessed. A stylus position interpolation function is then determined by curve fitting based on the touch sensor data corresponding to the set of known locations and the stylus location data reflecting the set of known locations.

17 Claims, 12 Drawing Sheets

INTERPOLATION OF POSITION OF A STYLUS IN A TOUCH SENSOR

CROSS REFERENCE TO RELATED APPLICATIONS

This application claims priority to U.S. Provisional Patent Application No. 61/636,125, filed Apr. 20, 2012 and entitled "Interpolation of Position of a Stylus in a Touch Sensor", the entirety of which is hereby incorporated herein by reference.

TECHNICAL FIELD

This disclosure relates to techniques for interpolating a position of a stylus in a touch sensor.

BACKGROUND

Touch-sensitive systems detect and respond to one or more points of contact on a surface. A touch-sensitive system may be incorporated within an electronic device in the form of a touch screen display that allows a user to both view and manipulate objects using one or more inputs that contact the screen.

DETAILED DESCRIPTION

An electrostatic stylus may include a body that is typically the approximate size of a pen or pencil (e.g., around 150 mm long, and around 10 mm in diameter), and an electrically conductive electrode at the tip. The tip of the electrostatic stylus may be placed on the surface of a sensor matrix of conductors, or held in close proximity to a sensor matrix. In one implementation, the sensor matrix may include a first array of conductors arranged substantially parallel with one another and a second array of conductors arranged substantially parallel with one another. Conductors in the first array may be positioned substantially perpendicular to the conductors in the second array to form the matrix. While the conductors in the first array may be referred to as rows or row electrodes, and the conductors in the second array may be referred to as columns or column electrodes, the designation of the two arrays as the rows/row electrodes vs. columns/column electrodes is often arbitrary such that the designation may often be reversed with no change in meaning.

Some touch sensors may determine whether the electrostatic stylus is "touching" a particular location in the matrix by measuring a capacitance from rows and columns in the matrix close to that location to the electrically conductive tip of the stylus. Notably, the stylus may, but need not, be in physical contact with the matrix to "touch" the matrix. Rather, the input mechanism need only be in such physical proximity to the matrix to impart a change in capacitance at a position on the matrix. As such, it should be understood that the following disclosure's reference to "touch" need not require direct physical contact but rather more generally requires that an input mechanism engage the matrix (e.g., by being in direct physical contact or in close physical proximity to the matrix, such as by hovering within, for example, 10 mm of the matrix) such that a change in capacitance is imparted at a position on the matrix by the input mechanism. The change in capacitance can then be measured to determine the existence of the touch.

Figure 1:
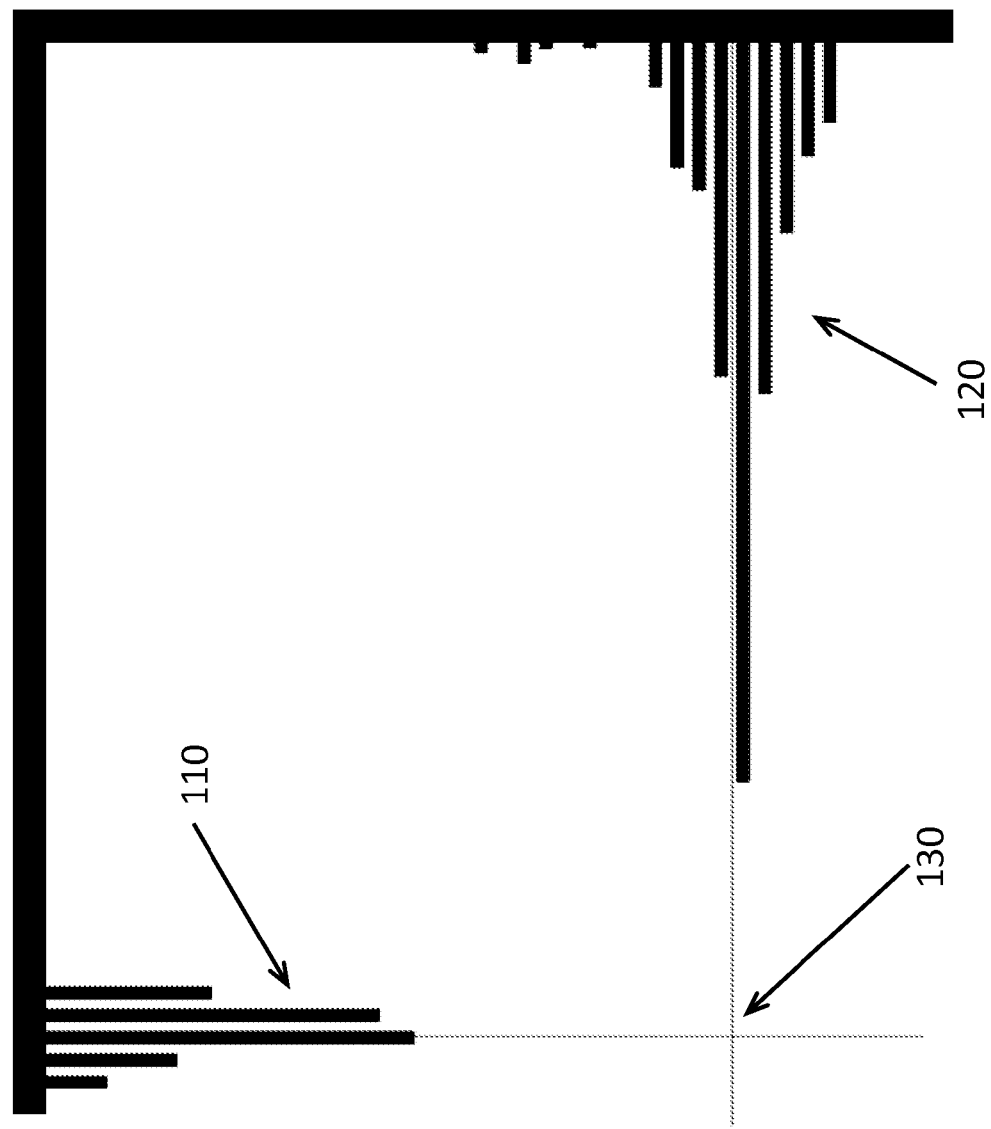
FIG. 1 is a diagram that provides a visual representation of measured capacitances for the rows and columns of a sensor matrix.

Regardless of the manner in which these capacitances are measured, a system may contain a function that receives as input the measured capacitances, and provides as output the (x, y) coordinates of a stylus location (i.e., the location where the stylus touches the sensor matrix). Determining the location of the stylus with an accuracy on the order of the matrix electrode pitch (also referred to as the sensor pitch) is relatively straightforward. For example, the column corresponding to the maximum measured capacitance from the stylus electrode tip to a column electrode may provide the x coordinate, and the row corresponding to the maximum measured capacitance from the stylus electrode tip to a row electrode may provide the y coordinate. The measured capacitances may be visualized as depicted in the diagram 100 shown in FIG. 1. The capacitances from the stylus tip electrode to each column electrode 110 and each row electrode 120 are plotted along the top and right edges, respectively, of the diagram 100. In the example shown in FIG. 1, the true position 130 of the stylus is close to the row and column corresponding to the maximum capacitance along each axis.

With such a system, the accuracy of the reported stylus position may be improved by decreasing the pitch of the row and column electrodes. Increasing the accuracy of the reported stylus position in this manner, however, typically increases the number of capacitances that need to be measured and, therefore, may increase the amount of circuitry and interconnect that are necessary. Increasing the amount of circuitry and interconnect, however, may result in an undesirable increase in cost or measurement time.

Nevertheless, increasing the accuracy of the reported stylus position to be significantly greater than the sensor pitch is often desirable. For example, a typical finger touch sensor may have a pitch around 6 mm, which may have been determined from the size of a human fingertip, and the necessity of interpolating the position of an object around that size. In contrast, a typical liquid crystal display (LCD) may have pixels on a pitch around 0.5 mm. In general, it may be straightforward to compute the interpolated position of a finger with high resolution, because the fingertip is large compared to the sensor pitch. It may be difficult to compute the interpolated position of a stylus with comparable resolution, because the stylus tip is small compared to the sensor pitch. Despite that, it may often be desirable to report the stylus position with an accuracy on the order of the LCD pixel pitch (or, more generally, the display pixel pitch) when using touch sensors that are more directed to detecting fingers and, therefore, that have a relatively coarse sensor pitch of around 6 mm.

To compute a more accurate estimate of the stylus's position without an undesirable increase in cost and/or measurement time, a more complex interpolation process may be necessary than that noted above. Specifically, rather than simply identifying columns or rows corresponding to the locations of matrix electrodes exhibiting the maximum measured capacitances, the estimated position may be interpolated as a continuous function of the measured capacitances.

Determining a closed form, continuous function of the measured capacitances that estimates the stylus's position, however, may be very difficult for both complex and simple touch sensor and stylus configurations. For example, the electrodes of the sensor matrix may be configured in a diamond pattern, where the traces are narrow where they cross over each other (to reduce undesired parallel-plate capacitance from a row to a column) and wide elsewhere (to reduce undesired series resistance). Determining a closed form, continuous function for such a complex geometry may be impossible. Even with a simple geometry, for example, a sensor matrix consisting of straight, thin wires, and a stylus tip electrode consisting of a perfect cone, with the axis of the cone normal to the plane of the sensor, it may be impossible to write a closed form, continuous equation for the capacitance from the stylus tip electrode to each row or column as a function of the stylus's (x, y) position. As such, with practical geometries, and when the stylus may be held at angles other than normal to the screen, it may be extremely difficult and perhaps impossible to develop a continuous, closed form interpolation function.

As described in further detail below, however, an interpolation function may instead be determined empirically by using a test apparatus to enable measurement of capacitances corresponding to different known true positions of a stylus and determining an interpolation function from the measured data using curve fitting, such as, for example, by using a linear least squares fit. Notably, the term "true position" is used herein to denote the actual location where the stylus touches the sensor matrix, as contrasted with the "reported position" of the stylus, which is the position that corresponds to the touch sensor's best estimate of the stylus's true position based on the measured capacitance data and is the position that is reported for use by higher level processes or applications that perform operations based on stylus position information. In some implementations, the reported position of the stylus is the estimated position produced by evaluating the interpolation function. In other implementations, the reported position is the estimated position produced by evaluating the interpolation function after that estimated position has been further modified by additional processing or filtering (e.g., temporal averaging to reduce the effects of noise).

The curve fit analysis may be simplified by leveraging known symmetries of capacitance measurements in a touch sensor, by recognizing that only capacitances from the stylus electrode tip to rows and columns very close to the stylus tip may contain useful information, and by assuming no cross-axis sensitivities, which is an assumption that has been found to introduce acceptably small errors in the estimated positions produced by the resulting interpolation function. Additionally, the curve fit analysis may be further modified to produce an interpolation function that is less sensitive to noise by incorporating penalties in the analysis that are proportional to the non-smoothness (or differential non-linearity) of the interpolation function and/or incorporating penalties that seek to minimize the sum of the squares of the partial derivatives of the interpolation function with respect to each input variable.

The angle of the stylus with respect to the sensor matrix can significantly impact the measured capacitances, and, therefore, the curve fit analysis may be further adjusted to take into account the angle of the stylus. Specifically, the curve fit analysis may incorporate angle offset variables that are also minimized as part of the analysis but that are discarded and not used in the determined interpolation function. Use of these angle offset variables in the curve fit analysis may significantly decrease the noise sensitivity of the estimated positions produced by the interpolation function in practice but also may introduce an offset in the estimated position that is relatively static with respect to changes in the true position of the stylus but that changes as the angle of the stylus with respect to the sensor matrix changes.

In practice, the angle of the stylus changes relatively slowly compared to the changes in the true position of the stylus. For example, a user holding the stylus like a pen changes the position of the stylus in his hand relatively slowly compared to the changes in position of the tip of the stylus on the touch sensor as the user interacts with the touch sensor using the stylus to "write" on the sensor matrix. Thus, in practical systems, the resulting offset in the reported stylus position when using an interpolation function that takes into account the angle of the stylus is typically much more visually acceptable to a user of the touch sensor than the much more rapidly and dramatically varying changes in the reported stylus position produced by an interpolation function that is more susceptible to noise because it fails to take into account the angle of the stylus. Moreover, in practice, the resulting stylus angle-sensitive static offset produced by the disclosed interpolation function is typically small (e.g., on the order of a few millimeters), making it even more visually acceptable to a user.

In some implementations, two interpolation functions are used to provide an improved estimate of the true position of the stylus. The first interpolation function is determined from an analysis that takes into account the angle of the stylus with respect to the sensor matrix, and the second interpolation function is determined from an analysis that does not take into account the angle of the stylus with respect to the sensor matrix. Notably, the first interpolation function produces an estimated position that is desirably less susceptible to noise but that introduces a static offset that is dependent on the angle of the stylus. The second interpolation function, in contrast, produces an estimated position that is more susceptible to noise but that does not include a static offset and, therefore, on average and over time, will more closely correspond to the true position of the stylus. In one sensor frame, for example, measured capacitance data for the frame can be inputted into the first and second interpolation functions to produce a first estimated position and a second estimated position, respectively, for the stylus in the sensor frame. An improved estimate of the true position of the stylus in the sensor frame can then be obtained by taking the first estimated position generated by the first interpolation function and adjusting the first estimated position by, for example, an average historic difference between the first and second estimated positions for a predetermined number of prior sensor frames.

Figure 2:
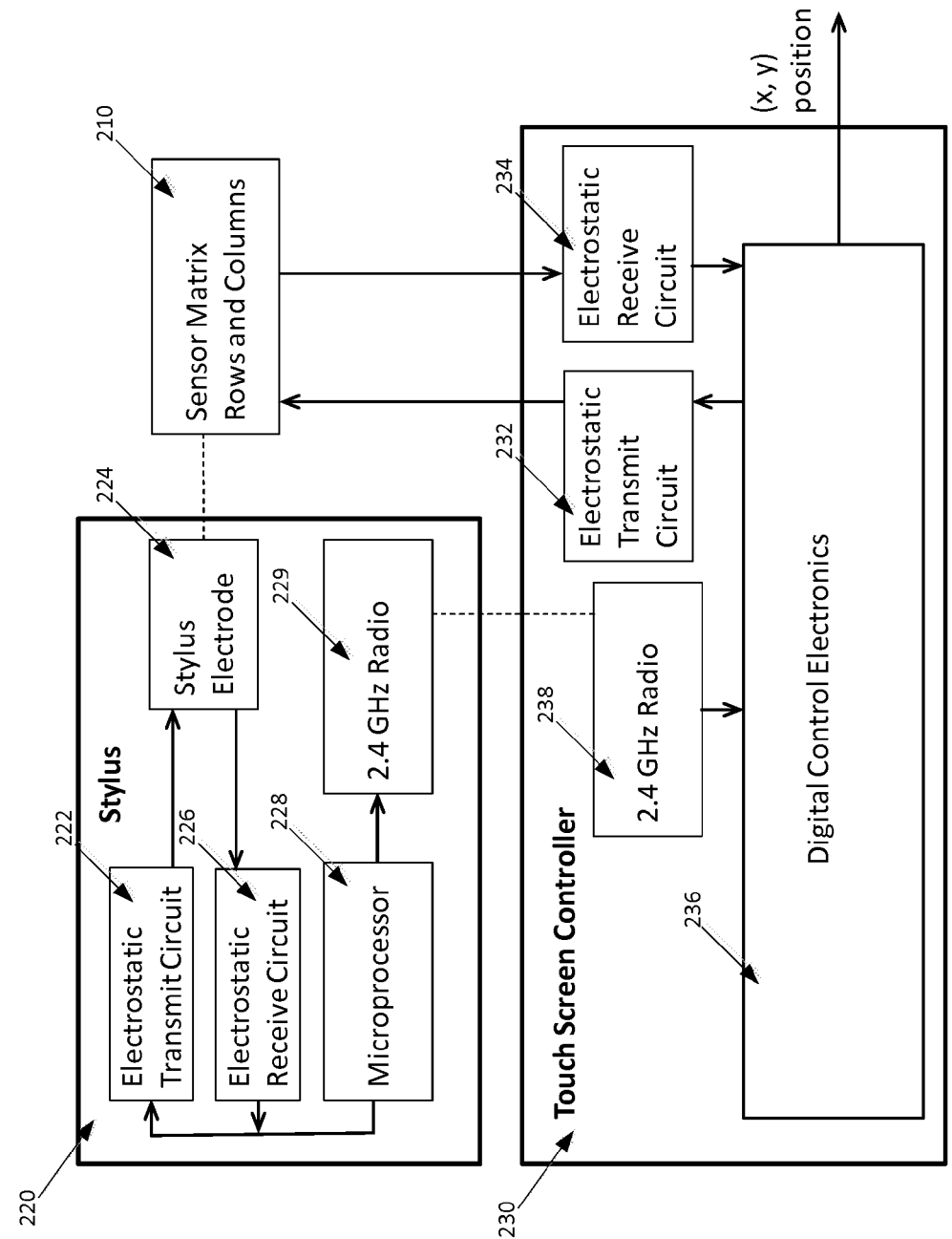
FIG. 2 is a diagram of a touch sensor system that uses an interpolation algorithm that was determined from curve fitting measured capacitance data to estimate a location of a stylus touching a touch screen.

FIG. 2 is a diagram of a touch sensor system 200 that uses an interpolation algorithm that was determined from curve fitting measured capacitance data to estimate a location of a stylus touching a touching a touch screen. The touch sensor system 200 includes a sensor matrix 210, a stylus 220, and a touch screen controller 230. Notably, the touch sensor system 200 is a capacitive touch sensor system having a sensor matrix incorporated into a display device (not shown) to create a touch screen. The touch sensor system 200 is a particular implementation of a touch sensor system that is able to leverage the improved interpolation techniques described herein. However, it should be understood that system 200 is merely exemplary and that other touch sensor systems that do not include a touch screen (e.g., instead include a separate display and a touch pad) and/or that detect touches through a mechanism other than changes in capacitance also may advantageously leverage the described improved interpolation techniques to provide a more accurate reported position for a stylus.

The sensor matrix 210 may include a first array of conductors arranged substantially parallel with one another and a second array of conductors arranged substantially parallel with one another. In some implementations, the conductors in the first array may be positioned substantially perpendicular to the conductors in the second array to form the matrix. While the conductors in the first array may be referred to as rows or row electrodes, and the conductors in the second array may be referred to as columns or column electrodes, the designation of the two arrays as the rows/row electrodes vs. columns/column electrodes is generally arbitrary such that the designation may be reversed with no change in meaning. The sensor matrix 210 may have a sensor pitch (i.e., a distance between two adjacent rows or columns in the sensor matrix) of, for example, 6 mm.

Because the sensor matrix 210 is being used in front of or within a display (e.g., an LCD) (not shown), the sensor matrix 210 may be substantially transparent to visible wavelengths of light. Specifically, the conductors in the matrix 210 may be made from transparent conductive material (for example, indium tin oxide), or, alternatively, may be made from opaque material, but with traces so small as to be inconspicuous (e.g., the conductors may be metal wires 10 um in diameter). In other implementations, the system 200 is not a touch screen system and the sensor matrix 210 is not positioned within, in front or behind a display but rather is positioned within a touch pad distinct from the display of the system.

The sensor matrix 210 may be similar or identical to a sensor matrix used to detect the presence of the user's finger touches, for example by measuring the capacitance from each row to each column, or by measuring the capacitance from each row and each column to ground. As such, the sensor matrix 210 may be used to measure both the position of a user's finger touches and the position of a stylus, as disclosed, for example, in application Ser. Nos. 12/838,420; 12/838, 422; 12/871,652; 12/857,024; and 12/871,668, which are incorporated herein by reference in their entirety.

In some implementations, the conductors in the first and second arrays of the sensor matrix 210 may intersect each other such that every row intersects every column conductor but does so at an angle that is not perpendicular, thereby providing a sensor having the form of a parallelogram. In other implementations, the conductors in the first and the second arrays of the sensor matrix 210 may instead form a more complex pattern, in which any two rows (or any two columns) are not necessarily parallel, or not necessarily laid out along straight lines. This may be desired for cosmetic reasons. For example, if the sensor electrodes are made using opaque metal, then moiré patterns against the spatial structure of the LCD may be more objectionable when the sensor electrodes are approximately parallel to the rows and columns of the LCD pixels than when they are rotated by some angle. The disclosed interpolation techniques, however, apply regardless of whether the rows and columns of the sensor matrix 210 intersect at right angles, at a different angle, or in a more complicated way.

The stylus 220 may include an electrostatic transmit circuit 222 for transmitting an electrical signal to the sensor matrix 210 through a stylus electrode 224 and may further include an electrostatic receive circuit 226 for receiving an electrical signal from the sensor matrix 210 through the stylus electrode 224. In some implementations, the stylus 220 does not include one or both of the circuits 222 and 226. In some implementations, the stylus 220 has a body approximately the size and shape of a pen or pencil (e.g., around 140 mm and around 10 mm in diameter) having a tip in which is positioned the stylus electrode 224.

Figure 12C:
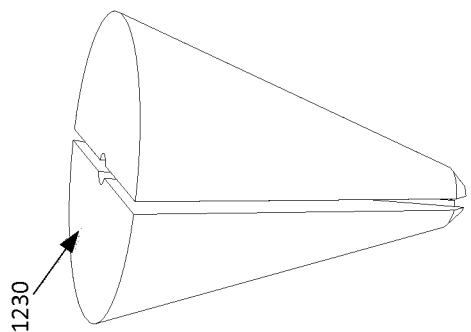
FIGS. 12A-C are diagrams depicting different tip electrode configurations for a stylus.
Figure 12B:
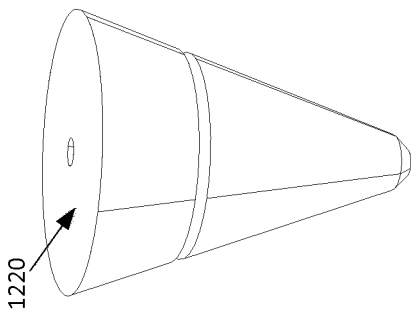
Figure 12A:
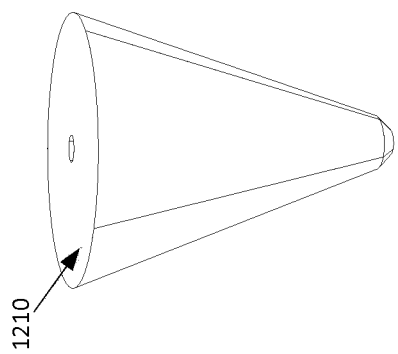

The tip of the stylus 220 may be made of electrically conductive material. For example, it may be made from metal wire or foil, or machined from solid metal stock. In some implementations, the stylus 220 may be designed with a tapered tip, to permit a user to select small on-screen objects without excessively occluding them. In these implementations, the stylus electrode 224 must fit within the taper of that tip. For example, the stylus electrode 224 may have the form of a cone with that taper, or a cone with steeper taper, or a thin metal wire, or any other shape fitting within that volume. The shape of the stylus electrode 224 may be rotationally symmetric about the axis of the stylus 220, to make the reported position of the stylus 220 insensitive to twist about that axis; or in other implementations, the stylus electrode 224 may be deliberately designed to be rotationally asymmetric, if the system 200 seeks to measure that twist. FIGS. 12A-12C, which are described in more detail below, depict various configurations for the stylus electrode 224.

The electrostatic transmit circuit 222 and the receive circuit 226 may be, for example, analog circuitry wired to the stylus electrode 224. In one implementation, the electrostatic transmit circuit 222 is configured to transmit a voltage to the conductors of the sensor matrix 210 electrostatically by applying a time-varying voltage to the tip of the stylus 220, and the electrostatic receive circuit 226 is configured to receive and measure a time-varying current from the conductors of the sensor matrix 220 electrostatically by maintaining the tip at a constant (i.e., a non-time-varying) voltage and measuring the current in to the tip. A microprocessor 228 inside the stylus 220 may sequence these operations, and use a wireless transmitter or transceiver 229, such as, for example, a 2.4 GHz radio transmitter or transceiver, inside the stylus 220 to wirelessly communicate with the touch screen controller 230. In other implementations, the stylus 220 may instead use a wired communication path to communicate with the touch screen controller 230. In some implementations, the stylus 220 may not include one or more of the electrostatic transmit circuit 222, the electrostatic receive circuit 226, the microprocessor 228 and the transmitter or transceiver 229 and may instead rely on a wired connection and/or corresponding circuitry in the touch screen controller 230.

The touch controller 230 may include an electrostatic transmit circuit 232, an electrostatic receive circuit 234, digital control electronics 236 and a wireless receiver or transceiver 238. The electrostatic transmit circuit 232 and the electrostatic receive circuit 234 may include electronics wired directly to the row and column conductors (also referred to as electrodes) of the sensor matrix 210 to electrostatically transmit and receive electric signals, respectively, to and from the conductors in the sensor matrix 210.

Digital control electronics 236 in the touch controller 230 sequence the transmit and receive operations of the electrostatic transmit circuit 232 and receive circuit 234 and determine, from the received signals, capacitances from the stylus electrode 224 to the row and column electrodes of the sensor matrix 210. The digital control electronics 236 may be configured to communicate with the stylus 220 by using the wireless receiver or transceiver 238 to coordinate the transmit and receive operations of the circuits 232 and 234 with the transmit and receive operations of the stylus 220. The digital control electronics 236 may determine capacitance values from the electronic signals received from the sensor matrix 210, and may relay capacitance values received using the wireless receiver or transceiver 238, and may evaluate an interpolation function using the capacitance values to arrive at an estimated position of the stylus 220 on the sensor matrix 210.

Specifically, to determine the location of the stylus 220, the system 200 may measure the capacitance from each row and each column of the sensor matrix 210 to the tip of the stylus 220. For a given row or column, the capacitance may be large when the stylus 220 is close to the row or column, and may be small when the stylus is far from the row or column. The capacitance may be measured by the system 200 in multiple different ways.

For example, in some implementations, the digital control electronics 236 or the microprocessor 228 of the system 200 may instruct the stylus 220 to apply a time-varying voltage from the stylus electrode 224 to system ground. The electrostatic receive circuit 234 of the touch screen controller 230 may hold each row and each column of the sensor matrix 210 at a constant DC voltage with respect to the system ground, and may measure the resulting time-varying current into each row and each column under the direction of the digital control electronics 236. The measured currents may be proportional to the capacitances under test.

In some of these implementations, the stylus 220 may be connected to the touch screen controller 230 by a wire such that the time-varying voltage may be applied to the stylus electrode 224 by circuitry included in the touch screen controller 230 that is referenced to a common system ground. However, in implementations like that shown in FIG. 2 where the stylus 220 is wirelessly connected to the touch screen controller 230, the stylus 220 may contain circuitry, i.e., an electrostatic transmit circuit 222, configured to apply the time-varying voltage, and the stylus may connect to ground through another electrode (not shown) on the stylus 220. The other electrode on the stylus 220, which is hereinafter referred to as the stylus ground electrode, may be large, and positioned so that the user contacts the stylus ground electrode (or couples capacitively to the stylus ground electrode with a capacitance much larger than the capacitance under test) when the user holds the stylus 220. Alternatively, the stylus ground electrode may be positioned and sized such that stray capacitances from the stylus ground electrode to nearby grounded conductors of the sensor matrix 210 are much larger than the capacitances under test (e.g., capacitances to the metal casing of a monitor containing the sensor matrix 210 and a display; or capacitances to the rows and columns of the display itself, which are at AC ground, although such capacitances also contribute error).

In other, more complex, implementations, the system 200 may instead measure the capacitances using a more complex technique that includes time-multiplexing the energizing of each column of the sensor matrix 210. Specifically, the digital control electronics 236 of the touch screen controller 230 may instruct the electrostatic transmit circuit 232 to apply a time-varying voltage to each column of the sensor matrix 210 in sequence, with the inactive columns held at some DC voltage. Such a system 200 may measure the capacitance from each column to the stylus tip electrode 224 by holding the stylus tip electrode 224 at a constant voltage, and measuring the current into that node during each timeslot. Notably, this same system 200 may simultaneously measure the position of finger touches by holding the rows at a constant DC voltage, and measuring the current into each row. The measured currents are proportional to the capacitance from the active column to each row, and, therefore, may be used to measure the position of finger touches. In some implementations, the system 200 may also add one additional timeslot, in which all rows and columns are held at constant DC voltage, and a time-varying voltage is applied to the stylus tip electrode 224. By measuring the current into each row, such a system 200 may measure the capacitance from each row to the stylus tip electrode. The above-noted systems may have the advantage of measuring the capacitances from each row to each column (which are used for finger touch) and from each row and each column to the stylus tip electrode (which are used for the stylus) simultaneously. Examples of such systems are disclosed in application Ser. Nos. 12/838,420; 12/838,422; 12/871,652; 12/857,024; and 12/871,668, which are incorporated herein by reference in their entirety.

Other implementations of system 200 may measure the capacitances in a manner that is different from those described above. Regardless of how the capacitances are measured, the digital control electronics 236 of the system 200 use all or a subset of the measured capacitances to evaluate an interpolation function and provide, as an output, the (x, y) coordinates of the location of the stylus 220.

Figure 3:
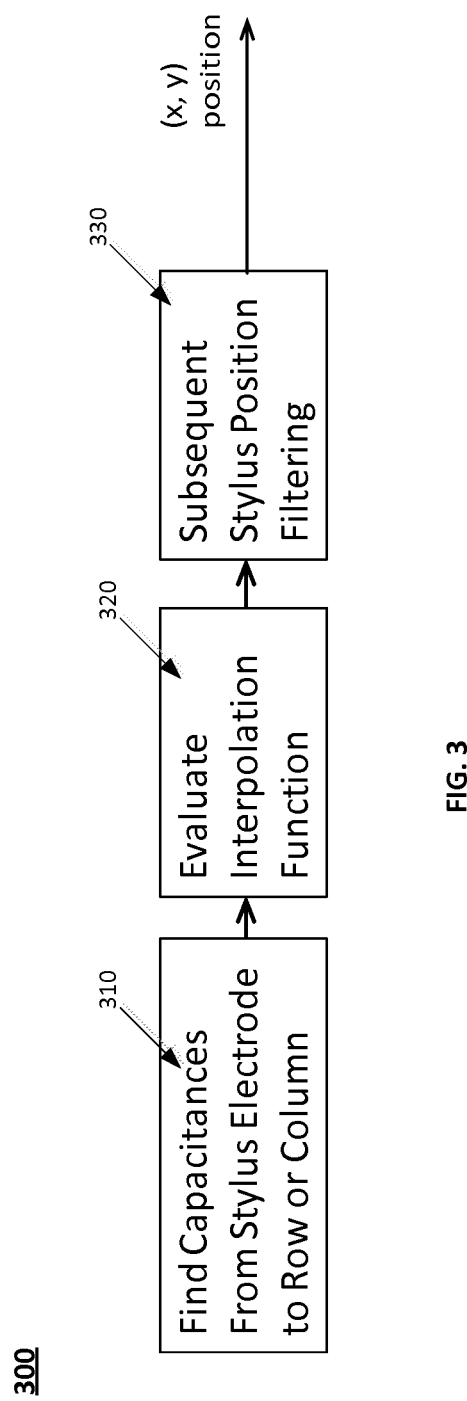
FIG. 3 is a flow diagram depicting a process for reporting a stylus position from measured capacitance data by using one or more interpolation functions.

FIG. 3 is a flow chart of an example process 300 for determining and reporting a stylus position using an improved interpolation function. The following describes process 300 as being performed by the digital control electronics 236 of the system 200 that is described with reference to FIG. 2. However, the process 300 may be performed by other computer systems or system configurations.

The digital control electronics 236 receives or otherwise accesses a set of data reflecting the measured capacitances for the various conductors in the sensor matrix 210 (310). The set of data may not reflect all of the capacitances measured by the system 200 but rather may only reflect a subset of the measured capacitances that is deemed to contain the most useful information. Specifically, the set of data may only include capacitance data for the row having the maximum measured row capacitance and a small number of its nearest neighbor rows (e.g., four, with two on either side), and capacitance data for the column having the maximum measured column capacitance and a small number of its nearest neighbor columns (e.g., four, with two on either side).

Figure 11:
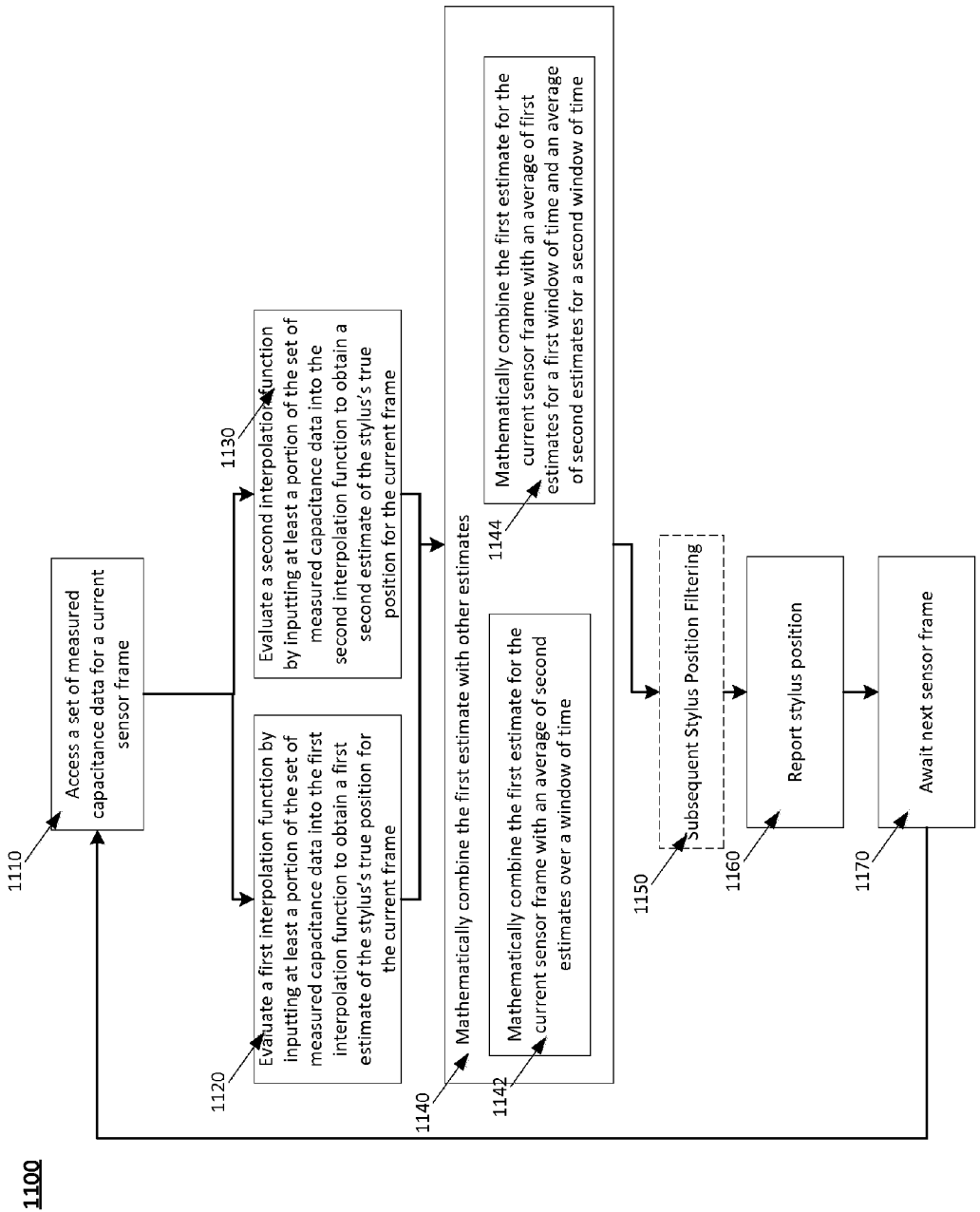
FIG. 11 is a flow diagram depicting a process for reporting a stylus position from measured capacitance data by using multiple different interpolation functions.

The digital control electronics 236 evaluate an interpolation function by inputting the set of data into the interpolation function (320). For example, when the interpolation function is a weighted sum of basis functions, the digital control electronics 236 may access, from a data store, the coefficients of the basis functions. The basis functions may be, for example, multivariate cubic polynomials of the type described in further detail below. The digital control electronics 236 may input the set of data reflecting the most useful measured capacitances into the resulting polynomial function to generate a preliminary estimate of the stylus's true position. In some implementations, the digital control electronics 236 may evaluate multiple different interpolation functions for each axis of the sensor matrix 210 to produce multiple different estimates that are then combined together to provide an estimate of the true position of the stylus along each axis of the sensor matrix 210. Process 1100, which is described below with respect to FIG. 11, is an implementation example of process 300 that combines multiple different interpolation functions to generate a more accurate reported position for the stylus.

The preliminary estimate of the stylus's true position may be processed or filtered to generate a reported position for the stylus that can then be passed to higher-level application software for further processing (330). The processing or filtering of the preliminary estimate may, for example, include reducing the effects of temporal noise by temporal averaging of the preliminary estimate with the preliminary estimates or reported positions generated in a predetermined number of previous sensor frames (e.g., one or two frames when the stylus is moving quickly, or tens of frames when the stylus is moving slowly, for typical frame rates of approximately 100 Hz).

Developing the Interpolation Function Empirically—Proposed General Form of Function As noted above, it may be preferable to develop an interpolation function empirically because, with practical geometries and when the stylus 220 may be held at angles other than normal to the screen, it may be very difficult and possibly impossible to develop an interpolation function in a continuous, closed form. Developing the interpolation function empirically may involve collecting sensor data and then performing a curve fitting analysis on the collected sensor data to determine the interpolation function.

The stylus 220, as a rigid body in space, may initially have six degrees of freedom: three translational, and three rotational. The measured capacitances (or, more generally, measured sensor data) may, therefore, be written as a function of those six variables. However, the number of variables may be decreased in view of the specific stylus and touch screen/pad geometries/interactions.

Specifically, if the tip electrode of a stylus 220 is rotationally symmetric, then the measured capacitances may be completely insensitive to the twist of the stylus 220 about its axis. Thus, one rotational degree of freedom and its corresponding rotational variable may be removed from the function. Additionally, the position of the stylus 220 may be assumed to be reported only when its tip is in contact with the plane of the sensor matrix. This simplifying assumption allows the further removal of one translational degree of freedom and its corresponding translational variable from the function. Thus, the measured capacitances may be modeled as a function of two positions, and two rotations of the stylus 220.

The two positions of the stylus 220 may, for example, be represented by scalar variables x and y, which represent the translation of the tip of the stylus 220 along axes parallel to the row and column electrodes respectively. The two rotations of the stylus 220 may, for example, be represented as angles A and B, where the angles A and B are given by the inverse sine of the dot product of a unit vector parallel to the axis of the stylus 220 against unit vectors parallel to the row and column electrodes respectively, where the inverse sine is defined to report values in [−90, +90] degrees. Notably, angles A and B are, therefore, zero when the stylus 220 is normal to the plane of the sensor matrix 210, and largest when the stylus 220 is approximately coplanar with the sensor matrix 210. In practice, the taper of the tip of the stylus 220 may make it impossible to hold the stylus tip in contact with the plane of the sensor matrix 210 beyond a certain angle from normal (e.g., around +/−60 degrees).

Ideally, the reported position may be sensitive only to x and y, and insensitive to the angles A and B. After all, when a tip of the stylus 220 is stationary at a particular location on the sensor matrix 210, a system 200 should not deem that the tip of the stylus 220 has somehow moved from that particular location to a new location simply because a user holding the stylus 220 has adjusted the angle of the stylus 220 with respect to the sensor matrix 210 while keeping the tip entirely stationary on the sensor matrix 210. For example, a user may simply shift his or her hand holding the stylus 220, thereby causing the stylus 220 to be held more perpendicular to the sensor matrix 210, without lifting, moving, or otherwise changing the location of the tip of the stylus 220. Such a shift of the user's hand, which imparts a change in angle between the stylus 220 and the sensor matrix 210, ideally, should not produce a new reported position for the stylus 220. As such, while the measured capacitances may be a function of not just x and y, but also angles A and B, an interpolation function that is attempting to estimate position from the measured capacitances should ideally be designed to be sensitive to only x and y.

Some implementations of system 200 may additionally or alternatively attempt to estimate the angle of the stylus 220 from the measured capacitances. Such implementations, however, may develop and use a separate angle interpolation function that is designed to be sensitive only to those angles and, to the extent that the system 200 also reports stylus position information, may still use a position interpolation function that, as noted above, is ideally designed to be sensitive to only x and y.

Figure 4:
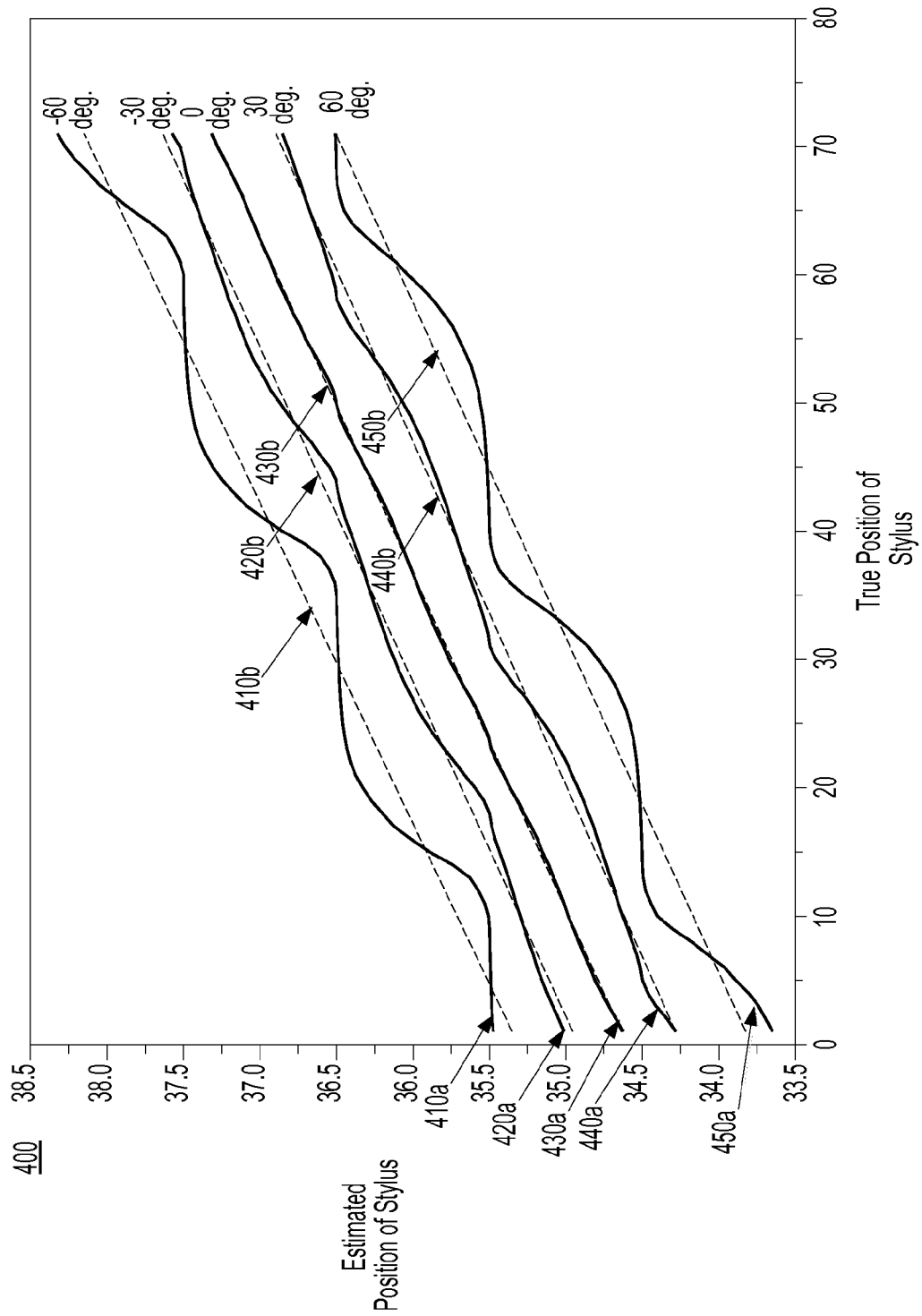
FIG. 4 is a graph of an estimated position of a stylus depicted as a function of a true position of the stylus for a particular interpolation function.

The importance of decreasing the interpolation function's sensitivity to angle in estimating stylus position may be shown best by considering a naively constructed interpolation function that is generally sensitive to both the translations (x, y) and the angles (A, B). Such a function may be significantly nonlinear, with that nonlinearity periodic over the pitch of the sensor matrix 210. FIG. 4 shows a graph 400 of the estimated position of a stylus as a function of the true position of the stylus. Graph 400 includes thick traces 410a, 420a, 430a, 440a and 450a that are generated using the poor interpolation function when the stylus 220 is positioned, respectively, at angles of {−60, −30, 0, 30, 60} degrees from normal to the screen (i.e., sensor matrix 210). The thick traces 410a, 420a, 430a, 440a and 450a denote the estimated position produced by the poor interpolation function. Graph 400 further includes thin dashed traces 410b, 420b, 430b, 440b and 450b that denote the best-fit line of the thick traces 410a, 420a, 430a, 440a and 450a, respectively. As shown in Graph 400, the estimated position produced by the poor interpolation function is observed to be relatively accurate when the stylus 220 is normal to the sensor matrix 210, as shown by the middle thick trace 430a. However, as the stylus 220 is rotated, a static offset is observed, and a large error periodic over the pattern pitch is observed, as shown by thick traces 410a, 420a, 440a and 450a.

Figure 5:
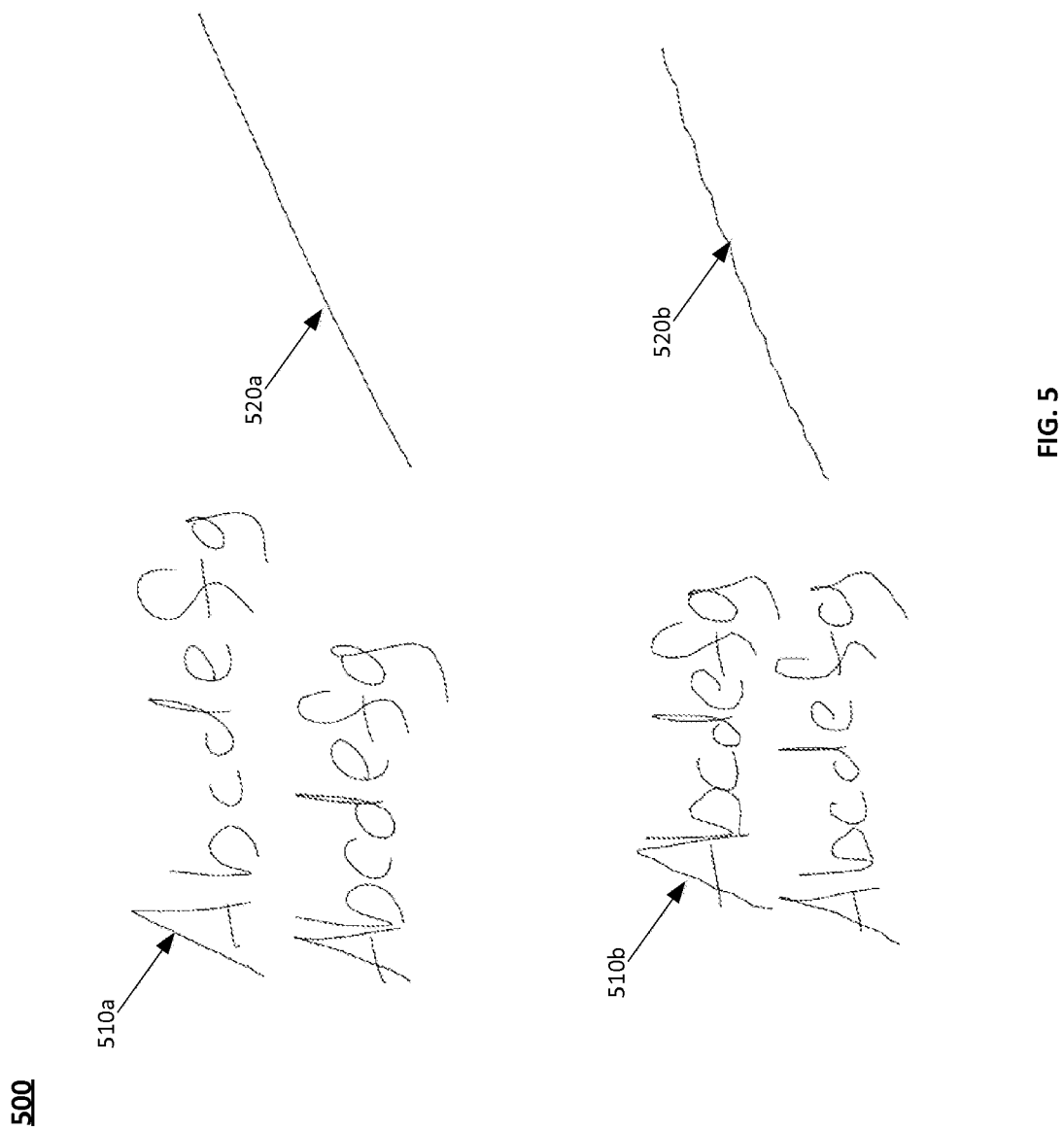
FIG. 5 is a diagram showing a first visual representation of reported positions produced through use of a first interpolation function and a second visual representation of reported positions produced through use of a second and different interpolation function.

FIG. 5 shows a diagram 500 that depicts: (1) the reported position produced through use of the above-described poor interpolation function that is sensitive to both the translations (x, y) and the angles (A, B); and (2) the reported position produced through use of an interpolation function that is obtained using the curve fitting techniques described in this disclosure and that, therefore, is significantly less sensitive to the angles (A, B). Specifically, diagram 500 shows a visual representation that may, for example, be generated by a pen emulation application for display on a touch screen that uses the stylus position information to emulate the behavior of a pen writing on paper. Diagram 500 includes letters 510a and a line 520a that were drawn based on reported position data produced using an improved interpolation function obtained by employing the techniques described in this disclosure. In contrast, letters 510b and line 520b, which are also depicted in diagram 500, were drawn based on reported position data produced using the poor interpolation function described above with respect to FIG. 4. As is clearly shown in diagram 500, the letters 510b and the line 520b produced using the poor interpolation function exhibit undesirable extra curves or wiggles as compared to the letters 510a and 520a produced using the improved interpolation function. As such, to minimize visual defects caused by changes in stylus angles A and B, the interpolation function should be designed to mitigate the effects of angle on the resulting estimated position.

As noted above, the interpolation function produces position information from the measured capacitances. In a practical system, however, only the capacitances from the stylus electrode tip to rows and columns of the sensor matrix 210 very close to the stylus tip may contain useful information. That is, for other rows and columns that are further away from the stylus tip, the capacitance may be so small as to be unmeasurable in the presence of electrical noise, or may be affected significantly by the presence of other conductive material (e.g., other finger touches) or the hand of a user holding a stylus.

Recognizing this, the form of the interpolation function may be modified to only take into account the maximum observed capacitance in each axis, and a small number of its nearest neighbors (e.g., four nearest neighbor rows/columns, where for example, two of the four are on each side of the row/column having the maximum observed capacitance). As a first step in developing the interpolation function, the various electrodes in the sensor matrix 210 are numbered and variables for the measured capacitances are defined. Specifically, in each axis, the electrodes may be numbered with consecutive integers (e.g., the rows may be numbered 0, 1, 2, . . . and the columns may be numbered 0, 1, 2, . . . ). Additionally, in each axis, the number of the electrode that corresponds to the maximum observed capacitance may be denoted by the variable maxp and the corresponding maximum observed capacitance may be denoted by the variable maxv.

In one implementation, an interpolation function for an axis will only use the measured capacitance to the stylus electrode tip of the row/column having the maximum observed capacitance (i.e., the row/column numbered maxp having capacitance maxv) and the measured capacitance of each of its two nearest neighbor rows/columns on either of its two sides. In this implementation, the capacitances to electrodes on either side of electrode number maxp may be denoted as pprev_r and prev_r, and next_r and nnext_r, respectively. In order, therefore, the observed capacitances are . . . , pprev_r, prev_r, maxv, next_r, nnext_r, . . . .

A practical circuit to measure these capacitances, however, may introduce a scale error. For example, if the impedance of the capacitance under test is compared to a constant reference capacitance, and that reference capacitance is smaller than its nominal value, then all reported capacitances will be larger than the correct values. To render our interpolation function insensitive to such a scale error, the maximum observed capacitance may be normalized to one, so that we compute pprev=pprev_r/maxv, prev=prev_r/maxv, next=next_r/maxv, and nnext=nnext_r/maxv. Thus, after normalization, the measured capacitances may be represented as . . . , pprev, prev, 1, next, nnext, . . . .

An interpolation function for a position of the stylus along a given axis, therefore, may be given the form adj(pprev, prev, next, nnext) such that for a given (row or column) axis, the true position true_pos is given by $$\text{true\_pos} = \text{max}p + \text{adj}(p\text{prev}, \text{prev}, \text{next}, n\text{next}) \quad (1)$$

In general, it may not be possible to assume that any measured capacitance is insensitive to any of the input variables (x, y, A, B). For example, the capacitances from the stylus tip electrode to the columns may be generally more sensitive to x, and the capacitances from that tip electrode to the rows may be generally more sensitive to y. However, the cross-axis sensitivity may not be zero, particularly when the pattern isn't linearly symmetric in the direction of the electrodes (e.g., if a diamond pattern is used). The problem may, however, be simplified by neglecting that cross-axis sensitivity, and assuming that only the capacitances to electrodes normal to an axis are sensitive to translation of the stylus tip along that axis. That is, under this assumption, the interpolation function adj(pprev, prev, next, nnext) for the x axis is assumed to depend only on the observed capacitances on the column electrodes and specifically, in this implementation, only on the observed capacitances on the 4 nearest neighbor column electrodes. As such, the x coordinate produced by the x-axis interpolation function adj(pprev, prev, next, nnext) is assumed to be entirely independent of the capacitances observed on the row electrodes. Using the same reasoning, the interpolation function adj(pprev, prev, next, nnext) for the y axis as assumed to depend only on the observed capacitances on the row electrodes and specifically, in this implementation, only on the observed capacitances on the 4 nearest neighbor row electrodes, with no dependence of the observed capacitances on the column electrodes. In some cases, this assumption may be found to introduce acceptably small error.

If the position and orientation of the stylus 220 are known (i.e., x, y, A and B are known), and the capacitance from each row and each column to the tip electrode are measured, it is possible to obtain one point on the interpolation function adj(pprev, prev, next, nnext). For example, the stylus 220 may be placed ¾ of the way between columns 6 and 7, closer to column 7. In such a case, the true position true_pos is 6.75; the maximum observed capacitance is at column 7; and pprev, prev, next and nnext are equal to 0.4, 0.8, 0.6 and 0.3, respectively. Thus, the x-axis interpolation function should be chosen such that $$6.75 = 7 + \text{adj}(0.4, 0.8, 0.6, 0.3) \quad (2)$$

The x-axis interpolation function adj(pprev, prev, next, nnext), therefore, should satisfy the following:

$$(3) \quad -0.25 = \text{adj}(0.4, 0.8, 0.6, 0.3)$$

A large number of equations similar to Equation 3 can be generated by moving the stylus 220 to known locations (i.e., known values of true_pos) along the surface of the sensor matrix 210, and measuring the capacitance from the stylus tip electrode 224 to each row or column (or some subset of those capacitances, as above) at each point. This large number of equations similar to Equation 3 can then be used to determine an interpolation function through curve fitting.

Developing the Interpolation Function Empirically—Collecting Data to be Used for Curve Fitting Ideally, the data to be used for determining the interpolation function would include data points over a full range of translational positions (x, y) and angles (A, B) of the stylus 220. In practice, however, collecting such a large number of data points would involve performing a large number of measurements, which may be costly and time consuming. Therefore, in some implementations, only a subset of the full range of translational positions (x, y) and angles (A, B) is varied, but the subset is chosen in such a way as to acquire as much useful information as possible with a minimum number of measurements.

For example, in some implementations of system 200, only a single rotational degree of freedom (i.e., A or B) and a single translational degree of freedom (i.e., x or y) are varied. Collecting data points where only a single rotational degree of freedom and a single translational degree of freedom are varied may be accomplished by attaching the stylus 220 to a moveable stage that is able to linearly translate (i.e., translate in one dimension) and rotate the stylus 220 such that its angle and true position on the sensor matrix 210 change. The system 200 then collects capacitance measurements that correspond to each known true position and angle (i.e., each known orientation) of the stylus 220.

In another implementation of system 200, the data points may correspond to computed capacitance values generated by, for example, a field solver rather than measured capacitance values. For example, a field solver that performs numerical integration of Maxwell's Equations under electrostatic assumptions may be used to compute the capacitance values for different true positions. However, due to the complexity of the sensor and stylus geometries, accurately modeling the system 200 in a field solver is difficult and complicated, and, therefore, it is often simpler to instead acquire the capacitance values for each true position of the stylus 220 by instead simply measuring the values on real hardware.

Figure 6:
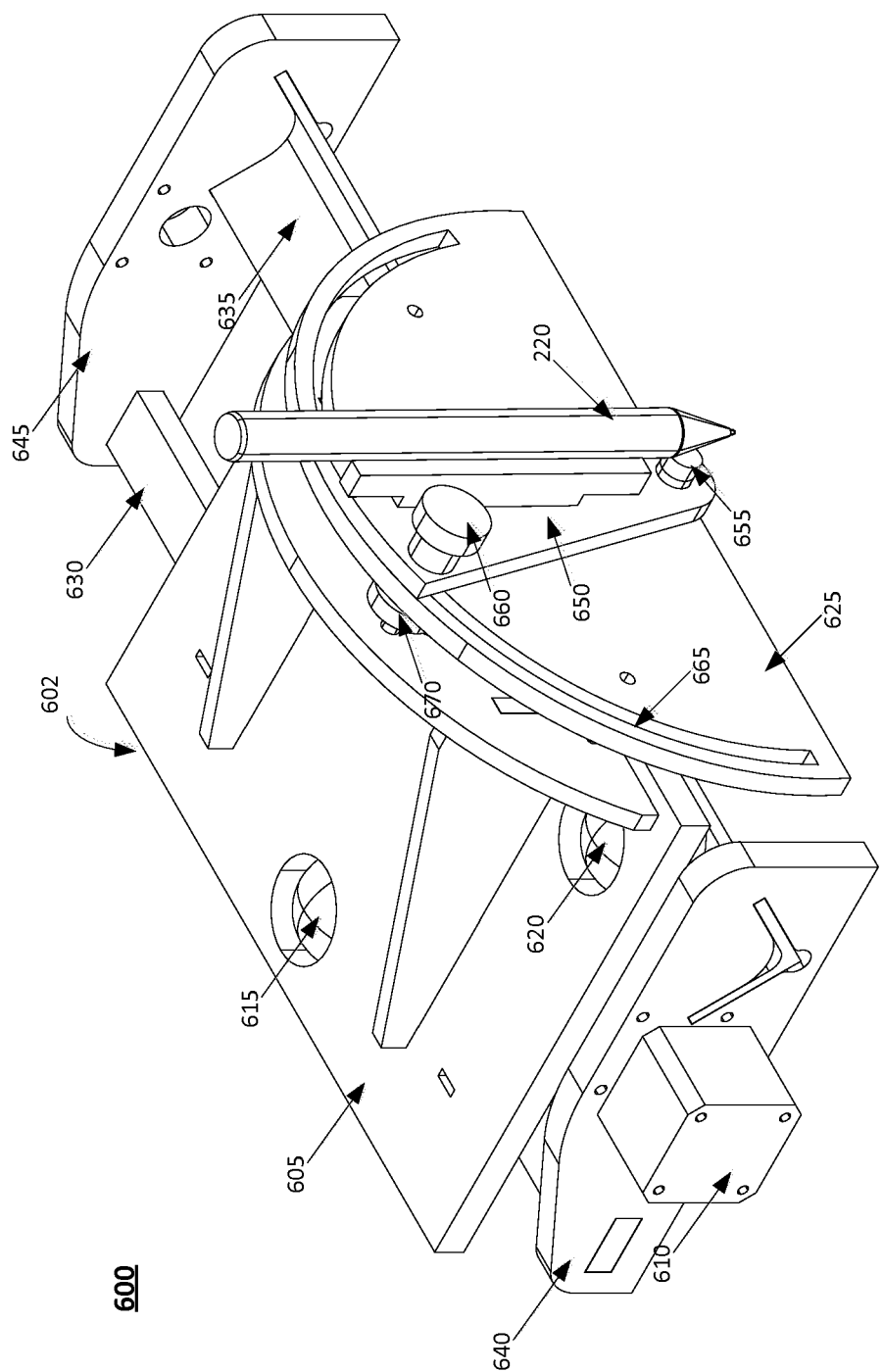
FIG. 6 is a perspective view of a test apparatus configured to collect data used to determine an interpolation function for a touch sensor system.

To make this large number of measurements, it may be desirable to automate the moveable stage to which is attached the stylus 220, so that multiple measurements may be made without human intervention. FIG. 6 shows an example of an automated test apparatus 600 that can be used to collect the data for curve fitting a stylus position interpolation function. The automated test apparatus 600 includes a stage assembly 602 composed of a translational stage 605 attached a rotational stage 625. The translational stage 605 is driven by a computer-controlled stepper motor 610, which moves the assembly 602 in incremental steps linearly in one translational direction (i.e., in one dimension).

The translational stage 605 includes a first ball bearing 615, a second ball bearing 620 and a third ball bearing (not shown). The third ball bearing is positioned behind the rotational stage 625, and, therefore, is not shown in FIG. 6. However, because the translational stage 605 is symmetric as shown in FIG. 6, the third ball bearing is understood to be positioned in the same manner as the second ball bearing 620 but in a symmetrical location on the partially hidden opposite side of the translational stage 605. The first ball bearing 615 couples the translational stage 605 to a flat guide rail 630, and the second ball bearing 620 and the third ball bearing (not shown) couple the translational stage 605 to the cupped guide rail 635. The coupling of the first ball bearing 615 to the flat guide rail 630 includes a single location of contact and, therefore, removes one degree of freedom of movement of the translational stage 605. Similarly, the coupling of the second ball bearing 620 to the cupped guide rail 635 includes two locations of contact and, therefore, removes two degrees of freedom of movement of the translational stage 605, and the coupling of the third ball bearing to the cupped guide rail 635 likewise also removes two degrees of freedom of movement of the translational stage 605. As such, five of the six degrees of freedom of movement of the translational stage 605 have been removed, thereby restricting the movement of the translational stage 605, and, hence, the stage assembly 602, to a single degree of freedom—i.e., its movement is restricted to one dimensional movement in a direction parallel to the longitudinal axes of the two guide rails 630 and 635.

One short end of each of the guide rails 630 and 635 is attached to a first end support 640 and the opposite short end of each of the guide rails 630 and 635 is attached to a second end support 645. The stepper motor 610 is attached to the first end support 640 and includes a lead screw (not shown) attached to the translational stage 605 that enables the stepper motor 610 to translate the stage assembly 602 incrementally back and forth along the guide rails 630 and 635 in one dimension. The stepper motor 610 may, for example, receive instructions for moving the stage assembly 602 from an external computer (e.g., a desktop personal computer running an application configured to enable a user to control the stepper motor 610).

As noted above, the rotational stage 625 is attached to the translational stage 605 such that the rotational stage 625 moves with the translational stage 605. The rotational stage 625 includes a carriage 650 to which the stylus 220 is removably or fixedly mounted. The carriage 650 is pivotably attached by a post 655 to the rotational stage 625 to allow the attached stylus 220 to pivot about an axis that is perpendicular to the direction of travel of the translational stage 605 and that is substantially within the plane of the sensor matrix 210. The carriage 650 further includes a screw 660 having a body that traverses an arcuate slot 665 defined by the rotational stage 625. The body of the screw 660 may be threaded and may be received by a nut 670. The screw 660 may be manually tightened or loosened to fix or change, respectively, the pivot angle of the stylus 220 about the above-noted axis. For example, when loosened, the arcuate slot 665 guides the body of screw 660 in an arcuate path to enable the carriage 650 and, hence, the stylus 220 attached to carriage 650, to freely pivot. After the carriage 650 reaches its desired pivot angle, the user may tighten the screw 660 to fix the pivot angle.

Figure 7:
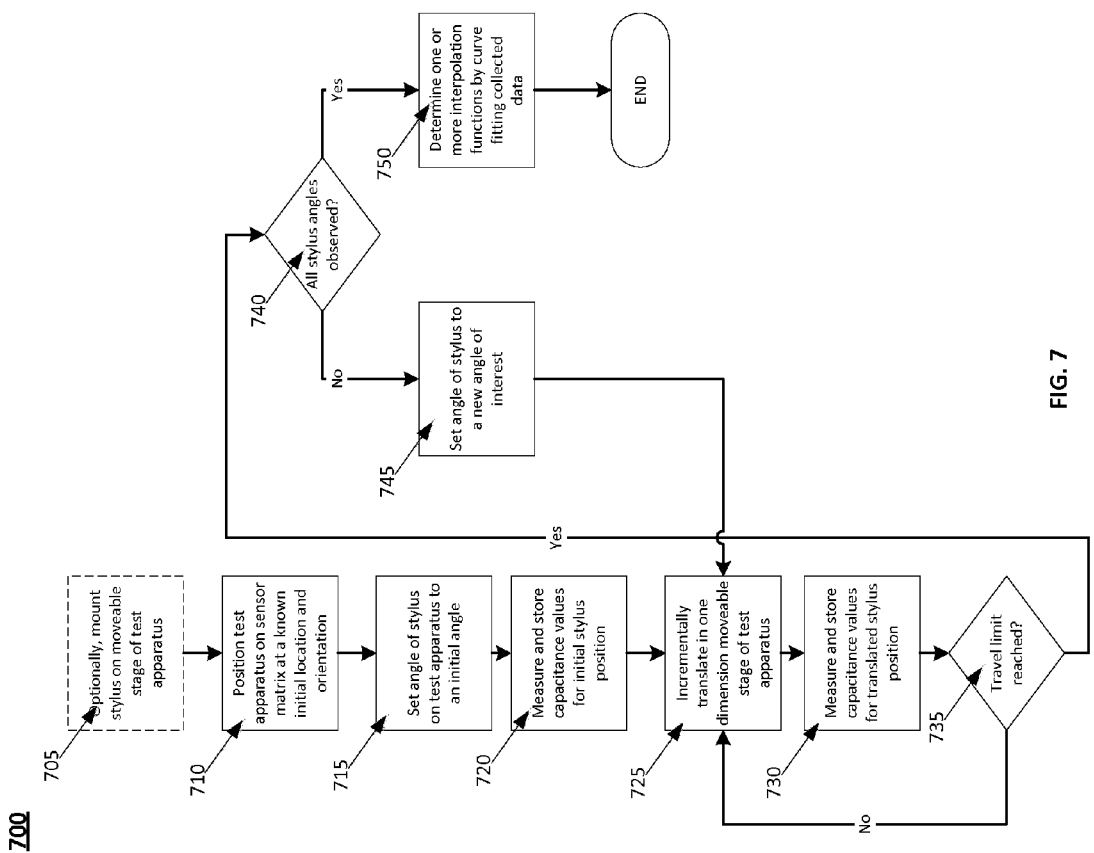
FIG. 7 is a flow diagram depicting a process for determining one or more interpolation functions based on collected sensor data.

FIG. 7 is a flow chart of a process 700 that may be used to collect data for curve fitting a stylus position interpolation function using a test apparatus. The following describes process 700 as being performed through use of the automated test apparatus 600 on system 200 described above with reference to FIGS. 2 and 6. However, the process 700 may be performed by using a different test apparatus, such as a different automated test apparatus (e.g., a test apparatus that is fully automated both for setting the translational position of the stylus and the rotational position of the stylus) or a different manual test apparatus (e.g., an apparatus that is fully manual with respect to setting both the translational position and the rotational position of the stylus) on a different touch-sensitive system.

Optionally, the stylus may be mounted on a moveable stage of the test apparatus (705). For example, the stylus 220 may be mounted on the rotational stage 625 of the moveable stage assembly 602 of the automated test apparatus 600 by, for example, snapping the stylus 220 into a channel or groove in the carriage 650 to form a friction-fit or snap-fit connection between the stylus 220 and the carriage 650. In some implementations, the test apparatus already includes a built-in stylus (e.g., the carriage 650 and the stylus 220 form a single integral unit) and, therefore, operation 705 is unnecessary.

The test apparatus is positioned on the sensor matrix such that the tip of the stylus is touching a known initial position on the sensor matrix and such that the test apparatus has a known orientation with respect to the column and row axes of the sensor matrix (710). For example, the automated test apparatus 600 may be placed on a touch screen such that the tip of the stylus 220 may come into direct physical contact with the sensor matrix 210 at a known initial true position. In one implementation example, the user makes a visible mark on the surface of the sensor matrix 210, and initially aligns the tip of the stylus 220 to that position by eye, possibly under magnification.

The known initial true position, for example, may be located at an edge of a particular unit cell of the sensor matrix 210. A unit cell of a sensor matrix is a portion of the sensor matrix bounded by two adjacent columns and two adjacent rows and that has an area that is the intersection of the area between two adjacent columns and the area between two adjacent rows. For example, a unit cell of a sensor matrix 210 that has a sensor pitch of 6 mm may be a square having an edge length of 6 mm, assuming that the columns and rows of the sensor matrix 210 are positioned perpendicular to each other. Notably, the unit cell of the sensor matrix 210 need not always be a square. For example, if the columns and rows of the sensor matrix 210 are not positioned perpendicular to each other but rather are positioned at a different angle with respect to each other, the unit cell may be a parallelogram or may have a different shape.

While the stage assembly 602 may be oriented such that the linear axis of the stage assembly 602 travels at any angle with respect to the rows and columns of the sensor matrix 210, some angles of travel may produce more useful data than other angles. Specifically, if the stage assembly 602 is placed with a slope (expressed a ratio of the translations in the directions of the sensor matrix 210 rows and columns) that is not expressible as the ratio of two small integers (for example, including 167:349, but not including 1:1, 2:3, or 500:1000), then the fractional part of each axis's interpolation adjustment (i.e., the adj_x and adj_y values produced by the two interpolation functions adj(pprev, prev, next, nnext) for the x and y axes for a given respective set of capacitance measurements) may be observed over a larger range of fractional parts of the other axis's interpolation adjustment. This may improve the utility of the acquired data to account for cross-axis sensitivity, regardless of whether that's modeled (by reporting, for example, an x position that is a function of both capacitances to columns and capacitances to rows), or whether that's ignored (by reporting, for example, an x position that is a function of only capacitances to columns). If the stage assembly 602 were placed, for example, to move the stylus 220 from position (0, 0) to (10, 10), then the resulting data would only indicate observation of the case where adj for the x axis is equal to 0.3 when adj for the y axis is also equal to 0.3. In contrast, if the stage assembly 602 instead moved the stylus 220 from (0, 0) to (10, 17), then the resulting data would indicate observation of the cases where adj_x=0.3 when adj_y=0.51, 0.21, 0.91, 0.61, . . . . By capturing data indicating observation of more such cases, the ability of an interpolation function developed using the captured data to return correct results at any combination of adj_x and adj_y is improved.

Before or after positioning the test apparatus on the sensor matrix, the angle of the stylus with respect to the plane of the sensor matrix 210 is set to a known value (715). For example, a user may manually set the angle of the stylus 220 on the automated test apparatus 600 by loosening screw 660 and pivoting the carriage 650 while the body of screw 660 travels along arcuate slot 665. After the carriage 650 reaches its desired pivot angle, the user may manually tighten the screw 660 to fix the pivot angle. For example, the user may fix the pivot angle initially at 60 degrees. In some implementations, the rotational stage 625 is automated such that it automatically and dynamically changes the pivot angle of the stylus 220 in response to commands issued by a computer processor (e.g., an external personal computer). In these implementations, the rotational stage 625 may include a separate motor that automatically pivots the carriage 650 on which is mounted the stylus 220.

Capacitance values for the known initial true position and angle of the stylus may be captured and stored as collected data (720). For example, the system 200 may measure capacitance data for the stylus 220 at the stylus's known initial true position at the stylus's known initial angle (i.e., at the stylus's known initial orientation) and may store this data in a local or remote data store communicatively coupled to the system 200 (e.g., a hard drive of the external personal computer that controls operation of the stepper motor 610).

The moveable stage on which is mounted the stylus may be incrementally translated in one dimension across the sensor matrix to position the tip of the stylus at a different known true position on the sensor matrix (725). For example, the stepper motor 610 of the automated test apparatus 600 may translate the stage assembly 602, and hence the stylus 220, a predetermined distance along its linear travel direction. In one particular implementation, the stepper motor 610 translates the stage assembly 602 a distance on the order of 1/100ths of an inch along its linear travel direction (e.g., it may translate the stylus 2/100ths of an inch). Since the initial true position of the stylus 220 was known when the automated test apparatus 600 was initially placed on the sensor matrix 210 and the incremental distance that the stylus 220 was moved is also known, the new true position of the stylus 220 is also known. Similar reasoning applies when obtaining the true position of the stylus 220 for subsequent incremental translations of the stylus 220.

Capacitance values for the translated true position of the stylus may be captured and stored as collected data (730). For example, the system 200 may measure capacitance data for the stylus 220 at the stylus's new true position after the stylus 220 has been stepped to a different location by the stage assembly 602. The new capacitance data corresponding to the new true position of the stylus 220 may then be stored in the local or remote data store for subsequent access when determining the interpolation function for the sensor matrix 210.

A determination is made whether the travel limit for the moveable stage assembly has been reached (735). The travel limit of the moveable stage assembly may be determined from the physical limits that the test apparatus places on the movement of the moveable stage (e.g., end supports 640 and 645 place limits on the travel of assembly 602). Alternatively, the travel limit of the moveable stage assembly may be set by a user ahead of time based on the amount of data that the user wishes to collect for the purpose of determining the interpolation function. In some implementations, the travel limit is determined from the dimensions of the unit cell of the sensor matrix 210. Specifically, the travel limit may be the distance that the moveable stage travels from an initial edge of the unit cell to an opposite or adjacent edge of the same unit cell. Accordingly, for a unit call that is a square 6 mm on a side, the travel limit may be as small as 6 mm (i.e., the distance of a direct line from one cell edge to the opposing cell edge) to as large as 8.48 mm (i.e., the distance of a direct line from one cell corner to the opposing cell corner).

Given the periodicity of the sensor matrix 210, the capacitance data captured for a single unit cell may be approximately the same as the capacitance data that would be captured for any other unit cell in the sensor matrix 210. However, in practice, the sensor matrix 210 may exhibit variation from cell to cell and, therefore, capturing more data from more unit cells on the sensor matrix 210 may improve the quality of the resulting interpolation function by providing a better estimate of the characteristics of the average unit cell of the sensor matrix 210. In one implementation, the travel limit of the assembly 602 of the automated test apparatus 600 is set at 3 inches with collection of measured capacitance data occurring at every 2/100ths of an inch.

If the travel limit for the moveable stage assembly has not been reached, process 700 returns to operation 725 and the moveable stage of the test apparatus is incrementally translated in one dimension across the sensor matrix to position the tip of the stylus at a different known true position on the sensor matrix.

If, on the other hand, the travel limit is reached, the moveable stage of the test apparatus stops moving and, optionally, may return to its initial position. For example, the stepper motor 610 of the automated test apparatus 600 may stop moving the assembly 602 when the 3 inch travel limit is reached and, optionally, return the assembly 602 back to its initial position.

If the travel limit has been reached, a determination is made whether all stylus angles for which data is to be collected have been observed (740). If all stylus angles for which data is to be collected have NOT been observed, the stylus is set to a new angle of interest either manually or automatically (745) and process 700 returns to operation 725 to collect capacitance data for the stylus at the new angle. For example, the user of the automated test apparatus 600 may manually pivot the carriage 650 to change the angle of the stylus from 60 degrees to 30 degrees. After manually changing the angle, the user may instruct the computer controlling the stepper motor 610 to begin incrementally moving the moveable stage assembly 602 along its linear direction of travel as described previously with respect to operation 725. In some implementations, the carriage 650 is pivoted automatically to change the angle of the stylus 220 from 60 degrees to 30 degrees by a motor controlled by a data collection application (which, in some implementations, may additionally control the stepper motor 610) executed by a computer processor internal to the automated test apparatus 600 or external to the automated test apparatus 600 but in communication with the automated test apparatus 600.

In some implementations, the moveable stage on which is mounted the stylus 220 may have returned to its initial position after the travel limit was reached. In these implementations, operations 725 and 730 may be repeated such that the stylus 220 steps through different true positions along the linear line of travel of the moveable stage beginning at the initial position and ending at the final position reached at the end of the travel limit. In other implementations, the moveable stage on which is mounted the stylus is NOT returned to its initial position after the travel limit was reached. In these implementations, operations 725 and 730 may be repeated such that the stylus 220 steps through different positions along the linear line of travel of the moveable stage beginning at the final position and ending at its initial position.

Accordingly, operations 725, 730, 735, 740 and 745 are repeated until all capacitance measurements for all true positions of the stylus at all angles of interest of the stylus are collected and stored in a data store. For example, a user may use system 600 with an incremental step distance of 2/100ths of an inch, a travel limit of 3 inches, and for stylus angles of 30, 0 and −30. Process 700 would then yield approximately 450 different sets of capacitance measurements, i.e., 150 different sets for 150 different true positions (i.e., 3 inches/(2/100 inches)) at a stylus angle of 30, 150 different sets for 150 different true positions at a stylus angle of 0, and 150 different sets for 150 different true positions at a stylus angle of −30.

After all of the data is collected for all of the different angles of interest, the data may then be used to determine one or more interpolation functions by curve fitting (750). For example, a linear least squares curve fitting analysis may be performed for each axis to determine an interpolation function for estimating stylus position along that axis, as described in more detail below.

In some implementations, the curve fitting analysis is performed by one or more processors of a personal computer. The personal computer may operate under control of a specialized application to access the collected data from the remote data store (e.g., a data store that may be accessed by the personal computer across a network, such as a LAN, a WAN or the Internet) or the local data store (e.g., from its own hard drive) and perform the curve fitting analysis based on the collected data. In some implementations, the specialized application also may direct the same computer to automatically control the linear translation of the stylus on the test apparatus (e.g., controls the operation of the stepper motor 610) and/or automatically control the rotation of the stylus on the test apparatus during data collection. In other implementations, the curve fitting analysis is performed by one or more processors internal to the test apparatus that also may optionally automatically control the linear translation and/or rotation of the stylus during data collection. In other implementations, the curve fitting analysis is performed by one or more processors internal to the touch-sensitive system.

Developing the Interpolation Function Empirically— Choose Basis Function, Simplify, and Perform Curve Fit Analysis As noted above, the collected data points may be used to develop an interpolation function by curve fitting. The interpolation function may be expressed as a weighted combination of basis functions. In one particular implementation, the basis functions chosen for the interpolation function are multivariate cubic polynomials in the normalized measured capacitance. Using these basis functions, the interpolation function may be defined as a weighted sum of polynomial terms of the form:

$$f_{abcd} = G_{abcd} * (pprev\hat{\ }a) * (prev\hat{\ }b) * (next\hat{\ }c) * (nnext\hat{\ }d) \quad (4)$$

with integers {a, b, c, d} in [0, 3] and some real gain G. Accordingly, 4^4=256 different polynomial terms are possible, which is a large number. While having such a large number of polynomial terms will improve the ability of the interpolation function to fit to the measured data, the risk of overfitting is also increased by such a large number of terms. However, the symmetry of the sensor matrix geometry allows the number of terms in the interpolation function to be decreased.

Specifically, due to this symmetry, the interpolation function must satisfy:

$$\text{adj}(pprev, prev, next, nnext) = -\text{adj}(nnext, next, prev, pprev) \qquad (5)$$

The above relation implies that if two terms are identical after interchanging (pprev, prev, next, nnext) and (nnext, next, prev, pprev) (i.e., that the two terms have (a0, b0, c0, d0)=(d1, c1, b1, a1)), then their gains must have equal magnitude and opposite sign. The two terms may, therefore, be combined into a single term. For example, when using the above-noted polynomial terms, instead of fitting to the two terms "...+G0100*prev+G0010*next+...," the curve fitting analysis fits to a single term "Gcombined*(prev−next)," reducing those two gains to be determined to one. Leveraging this symmetry significantly reduces the number of polynomial terms that need to be determined through the curve fitting analysis.

Additionally, if a single term is identical after interchanging (pprev, prev, next, nnext), and (nnext, next, prev, pprev), then it must occur with gain zero, and thus be discarded. For example, the above-noted interpolation function could not contain the polynomial "prev*next." In this particular example, we start with 4^4=256 terms, of which 4^2=16 are identical after reversing the input parameter list. This leaves 256−16=240 terms, which may be grouped in to symmetric pairs as described above, reducing the total number of terms to 240/2=120.

The above simplifications reduce the dimensionality of the gains, decreasing the tendency toward overfitting. The interpolation function is a linear combination of basis functions, and, therefore, may readily be determined by a linear least squares fit. Let us define $$C[k] = (pprev[k], prev[k], next[k], nnext[k]) \qquad (6)$$

where, for example, prev[k] is the capacitance described previously for the kth acquired data point. When the interpolation function is expressed as a linear combination of the polynomial terms set forth by Equation 4, the following equation may be written for each collected data point:

$$\text{sum}(f_{abcd}(C[k])) + \max p[k] = \text{true\_pos}[k] \qquad (7)$$

where true_pos is the true position determined with the test apparatus (e.g., automated test apparatus 600) and the interpolation function is expressed as sum($f_{abcd}$(C)) (i.e., a sum of the weighted polynomial terms shown by Equation 4 after being simplified to reduce the number of terms by using the principles described above).

As noted previously, a separate interpolation function may be determined for each axis x and y. As such, a first equation of the form of Equation 7 may be written for each collected data point by using the y coordinate of the known true position and the corresponding row electrode measured capacitances. These equations can then be used to determine an interpolation function sum($f_{abcd}$(C)) for the y axis of the sensor matrix through curve fitting. Similarly, a second equation of the form of Equation 7 may be written for each collected data point by using the x coordinate of the known true position and the corresponding column electrode measured capacitances. These equations can then be used to determine an interpolation function sum($f_{abcd}$(C)) for the x axis of the sensor matrix through curve fitting.

One way to perform the curve fitting to determine the interpolation function using the set of equations determined from the collected data points is to solve the set of equations in a least-squares sense for the set of weighted gains {$G_{abcd}$} for the polynomial terms of the interpolation function sum ($f_{abcd}$(C)). Notably, in the above treatment, cross-axis sensitivity has been ignored, but a different set of basis functions may be used to account for that if desired. In practice, however, this sensitivity may be observed to be an acceptably small effect.

Developing the Interpolation Function Empirically—Taking into Account Stylus Angle in the Curve Fit Analysis The above section described a technique to determine an interpolation function by using the set of equations determined from the collected data points to solve a set of equations of the form of Equation 7 in a least-squares sense for the set of weighted gains {$G_{abcd}$} for the polynomial terms of the interpolation function sum($f_{abcd}$(C)). Unfortunately, the results produced by this curve fitting technique may be found unacceptable for typical stylus tip electrode and sensor matrix electrode geometries. In fact, the fit even to the test data may be poor, and when the function is used in practice, it may be found to be extremely sensitive to noise. An example of the results of using such an ill-fitting interpolation function is shown in a graph 800 depicted in FIG. 8, where an estimated position is again plotted as a function of true position, with the stylus moved along the same straight line at the same five angles as shown in graph 400 of FIG. 4.

It may sometimes be preferable, therefore, to replace the equations of the form of Equation 7 with equations having the following form:

$$\text{sum}(f_{abcd}(C[k])) + \max p[k] + \text{offset}[\text{theta}] = \text{true\_pos}[k] \qquad (8)$$

where offset[theta] is an additional parameter to be determined by the least squares fit. A separate offset is used for each angle at which data were acquired. That is, each collected data point can be used to write an equation of the form of Equation 8, where the equation now additionally takes into account the angle of the stylus for the collected data point through inclusion of the offset[theta] parameter. The set of equations can then be solved in a least-squares sense, for {$G_{abcd}$, offset[ ]}. The coefficients {$G_{abcd}$} can then be used to construct the interpolation function, while the terms {offset [ ]} are ignored/discarded. By using equations of the form of Equation 8, which take into account the stylus angle of the collected data, instead of equations of the form of Equation 7, which do not take into account the stylus angle of the collected data, the resulting interpolation function may be of much higher quality.

Figure 9:
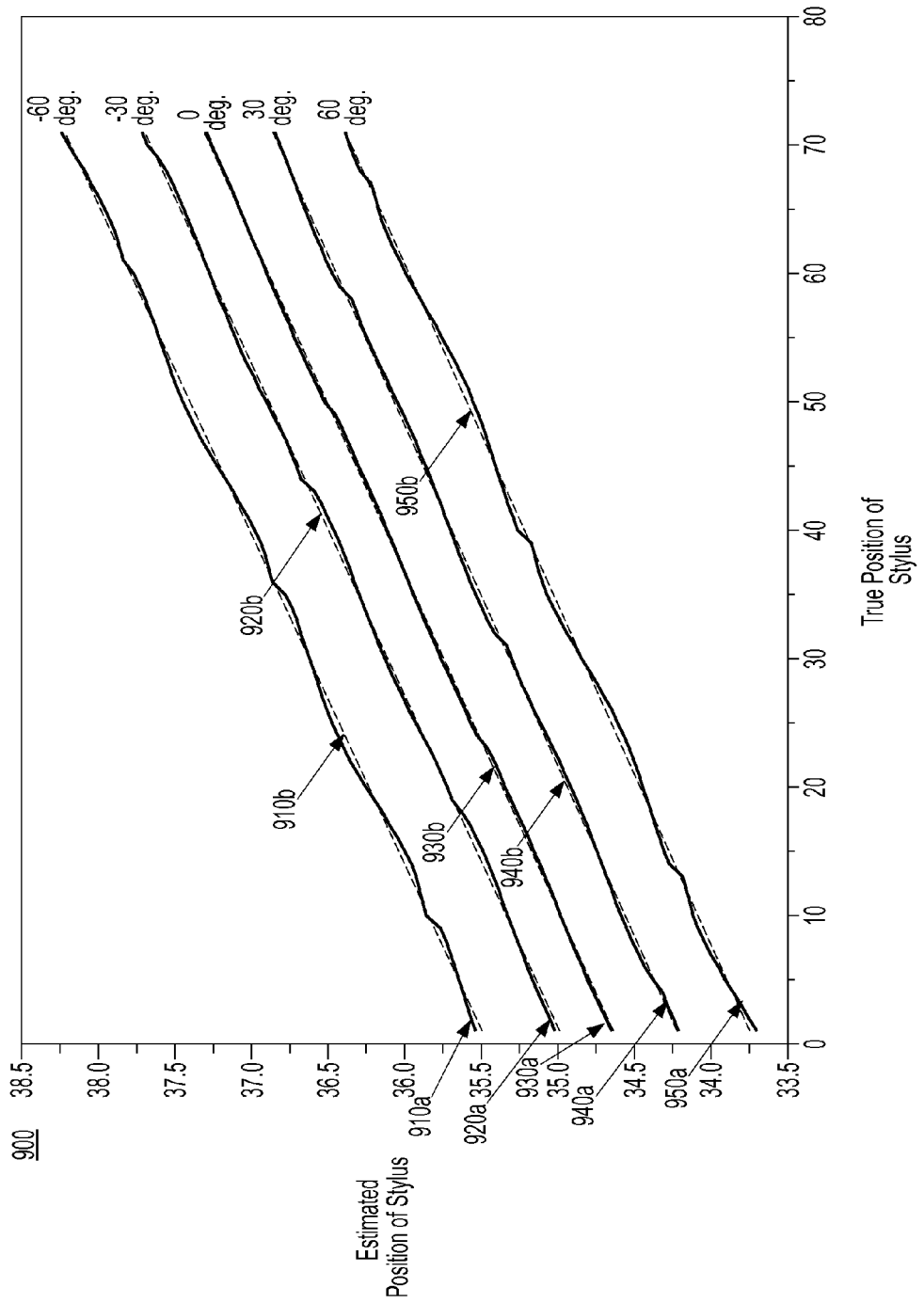
FIG. 9 is a graph of an estimated position of a stylus depicted as a function of a true position of the stylus for a particular interpolation function that exhibits a static offset.

FIG. 9 shows a graph 900 similar to graph 800, except that the estimated position plotted as a function of true position was generated by the improved interpolation function determined through use of equations of the form of Equation 8. Graph 900 shows the estimated position as a function of the true position when the stylus is moved along the same straight line at the same five angles as shown in graph 400 of FIG. 4.

Specifically, graph 900 includes thick traces 910a, 920a, 930a, 940a and 950a that are generated using the improved interpolation function when the stylus 220 is positioned, respectively, at angles of {-60, -30, 0, 30, 60} degrees from normal to the screen (i.e., sensor matrix 210). The thick traces 910a, 920a, 930a, 940a and 950a denote the estimated position produced by the improved interpolation function. Graph 900 further includes thin dashed traces 910b, 920b, 930b, 940b and 950b that denote the best-fit line of the thick traces 910a, 920a, 930a, 940a and 950a, respectively.

As shown in Graph 900, the improved interpolation function estimates a position that is sensitive to the angle of the stylus 220, since the offset[ ] parameters will generally not all be equal. This may be a desirable tradeoff, since the offset is small (on the order of a few millimeters) and constant. If a user calibrates the stylus 220 to account for their typical hand posture, or becomes accustomed to the slight offset, then a user may effectively draw with the stylus 220, while the error observed without this offset applied may render it impossible to draw a straight line. The offset may be modeled in other ways; for example, the angle at which each set of data was recorded may be tracked, and the adjustment may then be modeled as a linear or other function of that angle. Nevertheless, the approach described above, in which a separate extra parameter is introduced for each set of data to reflect the angle corresponding to each set of data, may be preferred, since it also compensates for offset error in the measured true position (which depends on an initial position set by eye, and may, therefore, be somewhat inaccurate).

Figure 8:
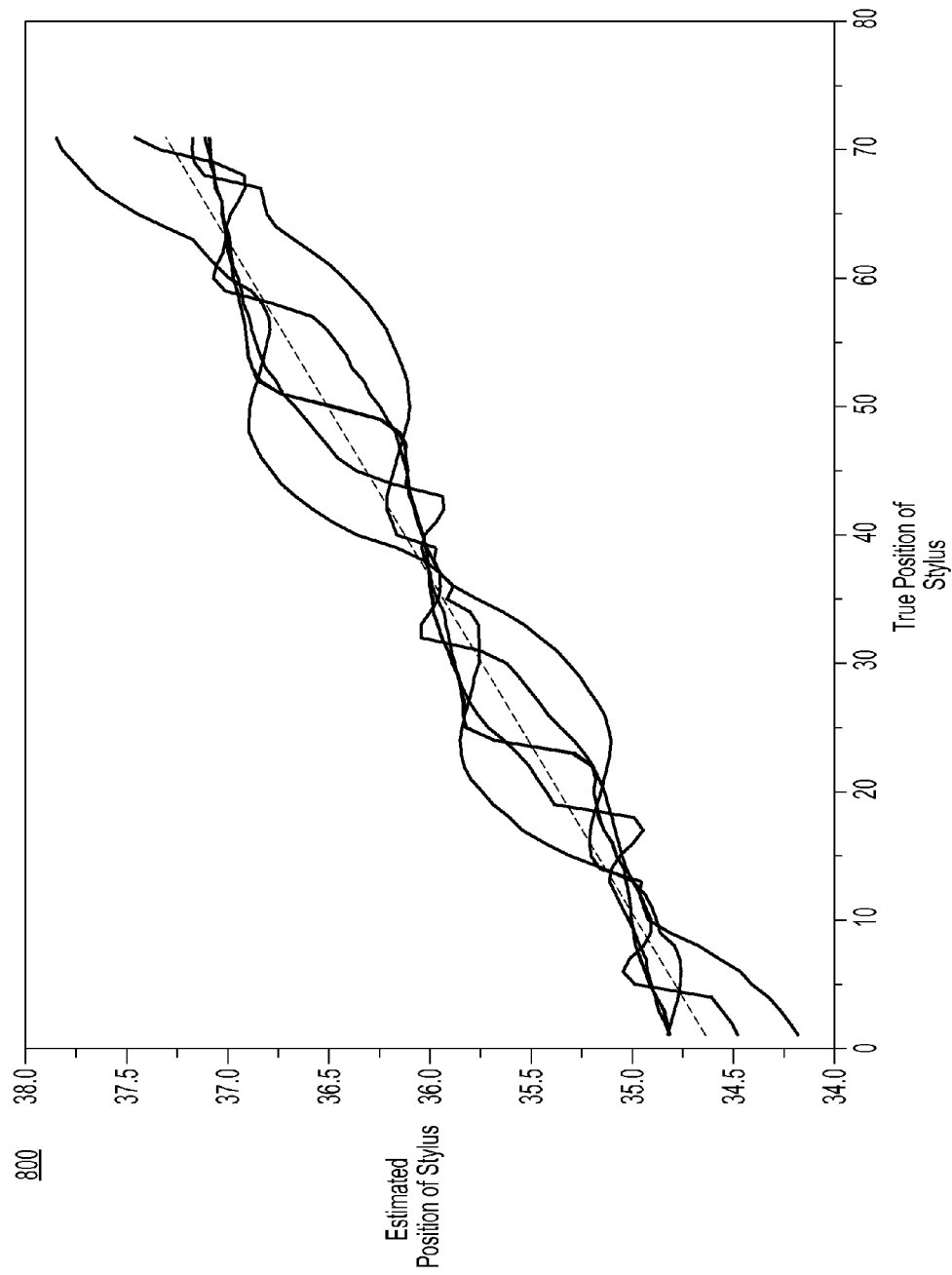
FIG. 8 is a graph of an estimated position of a stylus depicted as a function of a true position of the stylus for a particular interpolation function that does not exhibit a static offset.

Developing the Interpolation Function Empirically—Adding a Penalty to the Curve Fit Analysis to Encourage Function Smoothness The resulting improved interpolation function may fit the acquired data closely and certainly better than the poor interpolation functions shown in graph 400 of FIG. 4 and graph 800 of FIG. 8. Nevertheless, the improved interpolation function may not be as smooth as desired. For example, a reported position with error of 0.5 mm may be preferable to a reported position with error of 0.3 mm, if in the former position the error has low spatial frequency content, varying slowly over the ~6 mm pitch of the sensor, and in the latter the error has high spatial frequency, varying quickly over that distance. Therefore, it may be desirable to also minimize a quantity proportional to the non-smoothness (or "differential non-linearity") of the reported position, and not just the absolute error ("integral non-linearity").

To do so for the example interpolation function $\text{sum}(f_{abcd}(C))$, additional equations (i.e., penalties) of the following form are written for each pair of spatially consecutive measured data points:

$$W_{\text{diff}}*(\text{sum}(f_{abcd}(C[k]) - f_{abcd}(C[k-1])) + (\max p[k] - \max p[k-1]) = W_{\text{diff}}*(\text{true\_pos}[k] - \text{true\_pos}[k-1]) \quad (9)$$

where $W_{\text{diff}}$ is a scalar weight. A larger choice for $W_{\text{diff}}$ will result in a smoother interpolation function at the cost of accuracy. In some implementations, this weight may be chosen to achieve the cosmetically best reported position, according to subjective human judgment. Since subtraction is a linear operation, determining the best fit interpolation function using these additional equations or penalties of the form of Equation 9 to improve the smoothness of the resulting interpolation function remains a linear least-squares problem.

Figure 10:
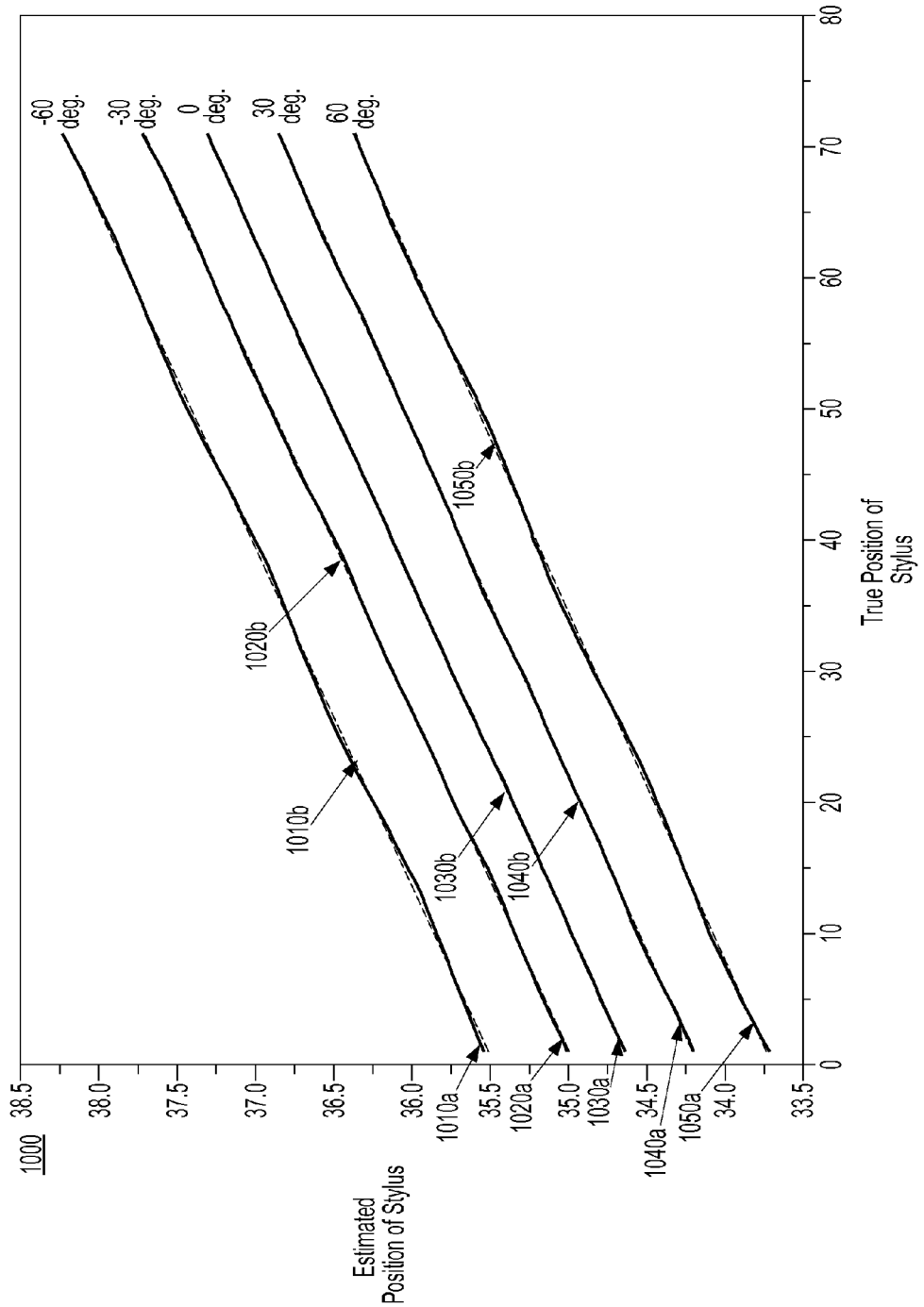
FIG. 10 is a graph of an estimated position of a stylus depicted as a function of a true position of the stylus for a particular interpolation function that exhibits a static offset and enhanced smoothness.

FIG. 10 shows a graph 1000 similar to graph 900, except that the estimated position plotted as a function of true position was generated by the improved interpolation function determined through use of equations of the form of Equation 8 and additional equations of the form of Equation 9. Graph 1000 shows the estimated position as a function of the true position when the stylus is moved along the same straight line at the same five angles as shown in graph 900 of FIG. 9.

Specifically, graph 1000 includes thick traces 1010a, 1020a, 1030a, 1040a and 1050a that are generated using the improved interpolation function with enhanced smoothness when the stylus 220 is positioned, respectively, at angles of {−60, −30, 0, 30, 60} degrees from normal to the screen (i.e., sensor matrix 210). The thick traces 1010a, 1020a, 1030a, 1040a and 1050a denote the estimated position produced by the improved interpolation function with enhanced smoothness. Graph 1000 further includes thin dashed traces 1010b, 1020b, 1030b, 1040b and 1050b that denote the best-fit line of the thick traces 1010a, 1020a, 1030a, 1040a and 1050a, respectively.

As shown by graph 1000, the estimated position produced by the improved interpolation function with enhanced smoothness includes a static offset that is dependent on the stylus angle and that is similar to that shown in graph 900. However, as expected, the traces of the estimated position are smoother at all angles as compared to the corresponding traces shown in graph 900. The enhanced smoothness is the result of adding equations of the form of Equation 9 to the least squares fit analysis.

Developing the Interpolation Function Empirically—Adding a Penalty to the Curve Fit Analysis to Decrease Sensitivity to Noise on Measured Capacitance The interpolation function generated from the least squares fit analysis using equations of the form of Equation 7 and equations of the form of Equation 9 may be smooth and fit the collected calibration data well. However, when the interpolation function is used in practice, the effects of noise may still be objectionable.

Noise, to a first order, may be modeled as additive to each capacitance, and independent per capacitance. In fact, noise may have a further structure; for example, when the capacitances are measured as in application Ser. Nos. 12/838,420; 12/838,422; 12/871,652; 12/857,024; and 12/871,668, all capacitances from the stylus tip to a row are measured simultaneously, so that noise that is localized in time but not in space will affect all those measurements equally. Nevertheless, after accounting for such effects as much as possible, the above assumption may be approximately correct.

Recognizing that the measured capacitances are susceptible to noise, it may be undesirable to have the interpolation function be very sensitive to the measured capacitances, as such heightened sensitivity will also make the interpolation function very sensitive to noise on the measured capacitances. To decrease the interpolation function's sensitivity to the measured capacitances, additional equations (penalties) may be added to the curve fit analysis that seek to minimize the sum of the squares of the partial derivatives of the interpolation function with respect to each input variable, at each measured point. Therefore, to decrease the sensitivity to noise of the exemplary interpolation function $\text{sum}(f_{abcd}(C))$, the following additional equations may be written for each data point, where the partial derivatives of the interpolation function $\text{sum}(f_{abcd}(C))$ for each input variable pprev, prev, next and nnext are evaluated at each data point:

$$W_{sens}*(\text{partial}(\text{sum}(f_{abcd}(C)), p\text{prev})) = 0 \quad (10)$$

$$W_{sens}*(\text{partial}(\text{sum}(f_{abcd}(C)), \text{prev})) = 0 \quad (11)$$

$$W_{sens}*(\text{partial}(\text{sum}(f_{abcd}(C)), \text{next})) = 0 \quad (12)$$

$$W_{sens}*(\text{partial}(\text{sum}(f_{abcd}(C)), n\text{next})) = 0 \quad (13)$$

$W_{sens}$ in Equations 10-13 is a scalar weight. The partial derivatives may be evaluated either symbolically or numerically. Since differentiation is a linear operation, identifying the interpolation function that best fits the collected data remains a linear least-squares problem even after adding partial derivative penalty equations having the form of Equations 10-13 to the set of equations used in the analysis. In Equations 10-13, as the scalar weight $W_{sens}$ increases, the worst-case sensitivities decrease, but the error increases. Notably, in the limit, as $W_{sens}$ goes to infinity, the interpolation function approaches a constant, which is not useful. In some implementations, the scalar weight $W_{sens}$ may be chosen to achieve the cosmetically best reported position according to subjective human judgment.

The noise sensitivity of the interpolation function becomes particularly noticeable when two measured capacitances of two different electrodes are very nearly equal such that the electrode corresponding to the maximum observed capacitance may change quickly due to noise in the measured capacitances. This situation occurs when the stylus is almost exactly between two rows or columns. In such a situation, the position estimated by the interpolation function should remain substantially constant and not drastically change due to capacitance variations caused by noise. That is, it is desirable for the interpolation function to be approximately continuous across the jump as the stylus moves from slightly closer to a first row or column to slightly closer to an adjacent second row or column. The structure of an interpolation function determined using the above technique (e.g., an interpolation function of the form $\text{sum}(f_{abcd}(C))$ that is determined from a linear least squares fit analysis using equations of the form of Equations 8 and 10-13 for each measured data point and of the form of Equation 9 for each pair of spatially consecutive measured data points) does not guarantee this, but the least squares fit will tend to return a function satisfying this property, in particular due to the differential nonlinearity penalties (e.g., due to inclusion of equations of the form of Equation 9).

Developing the Interpolation Function Empirically—Estimating True Position without a Static Offset and Estimating Other Quantities The above sections disclose a technique for determining an interpolation function that has reduced noise sensitivity as a result of explicitly taking into account the stylus angle in the curve fitting analysis (e.g., using equations of the form of Equation 8 rather than Equation 7 in the curve fitting analysis), increased smoothness as a result of including penalties that seek to minimize a quantity proportional to the non-smoothness (or "differential non-linearity") of the estimated position (e.g., adding equations of the form of Equation 9 to the curve fitting analysis), and further decreased noise sensitivity by further including penalties that seek to minimize the sum of the squares of the partial derivatives of the interpolation function with respect to each input variable, at each measured point (e.g. adding equations 10-13 to the curve fitting analysis). Notably, any one or more of these techniques may be used alone to improve the characteristics of an interpolation function determined from sensor data through curve fitting.

For example, an interpolation function that provides an estimate of the true position of the stylus 220 without the static offset may be determined by not explicitly taking into account the stylus angle in the curve fitting analysis. For the example interpolation function of the form $\text{sum}(f_{abcd}(C))$, the interpolation function may not exhibit the static offset if the linear least squares curve fitting analysis uses equations having the form of Equation 7, rather than Equation 8. The resulting interpolation function produces an estimated position that is more susceptible to noise but that does not include a static offset and, therefore, on average and over time, will more closely correspond to the true position of the stylus 220 than an interpolation function that explicitly takes into account stylus angle by using equations having the form of Equation 8. Notably, additional penalties of the form of Equation 9 and/or of the form of Equations 10-13 may be added to the curve fitting analysis to improve the smoothness and decrease the noise sensitivity of the resulting interpolation function.

A similar approach as that described in the previous sections also may be used to determine other quantities as a function of the measured capacitances. For example, a similar approach may be used to measure the angle of the stylus 220 with respect to the sensor matrix 210, by fitting to the known angle of the stylus instead of the known position.

Combining Results of Two Interpolation Functions to Obtain an Improved Estimate of True Position As described above, a first interpolation function that provides an estimate of the true position of the stylus 220 with a static offset (i.e., with a fixed offset that is constant with respect to changes in the true position of the stylus but that changes with stylus angle) may be determined by performing curve fitting using, for example, equations of the form of Equation 8, to obtain coefficients of the basis functions and the additional angle-dependent offset parameters. The first interpolation function may then be determined by discarding the angle-dependent offset parameters and using the obtained coefficients in combination with the corresponding basis functions to construct the interpolation function. Additionally, a second interpolation function that provides an estimate of the true position of the stylus without a static offset may be determined by performing curve fitting using, for example, equations of the form of Equation 7.

As noted previously, the first interpolation function produces an estimated position that is desirably less susceptible to noise but that introduces a static offset that is dependent on the angle of the stylus 220 with respect to the sensor matrix 210. The second interpolation function, in contrast, produces an estimated position that is more susceptible to noise but that does not include a static offset and, therefore, on average and over time, should more closely correspond to the true position of the stylus 220. By combining both the first and the second interpolation functions, it is possible to obtain an improved estimate of the true position of the stylus 220.

For example, the system 200 may, for example, average the estimated position produced by the second interpolation function over a long time (e.g., tens of seconds) and average the estimated position produced by the first interpolation function over a short time (e.g., tens of milliseconds, or not at all). The system 200 may then estimate the static offset as the difference between the average estimated position produced by the second interpolation function and the average estimated position produced by the first interpolation function. An improved estimate for the stylus's true position may then be determined as the estimate produced by the first interpolation function adjusted by the estimated static offset.

FIG. 11 is a flow chart illustrating an example process 1100 for determining and reporting a stylus position using two interpolation functions for each axis to obtain an improved estimate of the true position of the stylus. The following describes process 1100 as being performed by the digital control electronics 236 of the system 200 that is described with reference to FIG. 2. However, the process 1100 may be performed by other computer systems or system configurations.

The digital control electronics 236 receive or otherwise access a set of data reflecting the measured capacitances for the various conductors in the sensor matrix 210 for the current sensor frame (1110). The set of data may not reflect all of the capacitances measured by the system 200 but rather may only reflect a subset of the measured capacitances that is deemed to contain the most useful information. Specifically, the set of data may only include capacitance data for a current sensor frame for the row having the maximum measured row capacitance and a small number of its nearest neighbor rows (e.g., four, with two on either side), and capacitance data for the current sensor frame for the column having the maximum measured column capacitance and a small number of its nearest neighbor columns (e.g., four, with two on either side). A typical sensor frame may have a duration of approximately ten milliseconds.

The digital control electronics 236 evaluate a first interpolation function by inputting at least a portion of the set of measured capacitance data into the first interpolation function to obtain a first estimate of the stylus's true position for the current frame (1120). In some implementations, the digital control electronics 236 may access a set of coefficients $\{G_{abcd}\}$ for a first interpolation function having the form sum($f_{abcd}$(C)) that was generated by a linear least squares fit analysis using equations of the form of Equation 8 and optionally equations of the form of Equations 9 (to improve smoothness) and/or Equations 10-13 (to further decrease noise sensitivity). As noted previously, such an interpolation function is able to generate an estimate of one of the two coordinates x and y for the true position based on the normalized column or row capacitances, respectively (i.e., pprev, prev, next and nnext) and provides an estimate that is less sensitive to noise but that includes a static offset (i.e., an offset in the estimated coordinate that is relatively constant with respect to changes in the true position of the stylus but that changes as the angle of the stylus changes with respect to the plane of the sensor matrix)

The digital control electronics 236 evaluate a second interpolation function by inputting at least a portion of the set of measured capacitance data into the second interpolation function to obtain a second estimate of the stylus's true position for the current frame (1130). In some implementations, the digital control electronics 236 may access a set of coefficients $\{G_{abcd}\}$ for a second interpolation function having the form sum($f_{abcd}$(C)) that was generated by a linear least squares fit analysis using equations of the form of Equation 7 and optionally equations of the form of Equations 9 (to improve smoothness) and/or Equations 10-13 (to further decrease noise sensitivity). As noted previously, such an interpolation function is able to generate an estimate of one of the two coordinates x and y for the true position based on the normalized column and row capacitances, respectively (i.e., pprev, prev, next and nnext) and provides an estimate that is more sensitive to noise but that does not include a static offset. Notably, the second estimate and the first estimate are estimates of the same one of the two coordinates x and y of the true position of the stylus.

The digital control electronics 236 mathematically combine the first estimate with other estimates to obtain an improved estimate of the stylus's true position for the current frame (1140). In some implementations, the digital control electronics 236 combine the first estimate for the current sensor frame with an average of second estimates for all or selected sensor frames within a particular window of time (e.g., all sensor frames for the past 20 seconds) (1142). In other implementations, the digital control electronics 236 combine the first sensor frame with an average of first estimates for all or selected frames within a first window of time (e.g., all sensor frames for the past 30 milliseconds) and an average of second estimates for all or selected frames within a second window of time (e.g., all sensor frames for the past 30 seconds) (1144).

The digital control electronics 236 may access historic estimates (i.e., first and/or second estimates from previous sensor frames) and/or historic averages of estimates from a data store internal to the system 200 (e.g., an SRAM chip or a DRAM chip) and/or from a data store external to the system 200 but communicatively coupled to the system 200 over a network and/or via a wired or wireless link. The digital control electronics 236 also may store the calculated first and second estimates and averages in the data store during each sensor frame.

In some implementations, the digital control electronics 236 may combine the first estimate with other estimates by calculating an estimated static offset and adjusting the first estimate for the current frame by the estimated static offset. The estimated static offset may be determined at least in part from the second estimate for the current frame and/or from a combination of second estimates from one or more previous frames. In some implementations, the digital control electronics 236 may determine the estimated true position of the stylus for the current frame by subtracting the estimated static offset from the first estimate or by adding the estimated static offset to the first estimate.

The digital control electronics 236 may calculate the estimated static offset in many different ways. In some implementations, the digital control electronics 236 may calculate the estimated static offset as the difference between the first estimate and an average of second estimates for all or selected sensor frames within a first window of time (e.g., an average of second estimates for all sensor frames for the past 20 seconds).

In other implementations, the digital control electronics 236 may calculate the estimated static offset as the difference between an average of first estimates for all or selected sensor frames within a first window of time (e.g., an average of first estimates for all sensor frames for the past 20 milliseconds) and an average of second estimates for all or selected sensor frames within a second and different window of time (e.g., an average of second estimates for all sensor frames for the past 20 seconds). The duration of the first window of time may be advantageously chosen to be relatively short compared to the duration of the second window of time when, for example, the first interpolation function has the characteristics noted above with respect to functions determined from equations of the form of Equation 8 (i.e., has less noise sensitivity but exhibits a static offset) and the second interpolation function has the characteristics noted above with respect to functions determined from equations of the form of Equation 7 (i.e. has more noise sensitivity but does not exhibit a static offset and, therefore, provides a better estimate of true position when averaged over a longer period of time).

In yet other implementations, the digital control electronics 236 may calculate the estimated static offset by taking an average of the differences between the first estimate and the second estimate for all or selected sensor frames within particular window of time. For example, the digital control electronics 236 may calculate the estimated static offset by calculating an average of the difference between the first estimate and the second estimate for all sensor frames for the past 20 seconds.

Notably, operations 1120, 1130 and 1140 may be performed for each of the two axes of the sensor matrix 210 to determine an improved estimate of the x coordinate of the true position and an improved estimate of the y coordinate of the true position. As such, while process 1100 shows two different interpolation functions, some implementations may have four different interpolation functions, i.e., two for the x coordinate used to obtain an estimate of the x coordinate of the true position in accordance with operations 1120, 1130 and 1140, and two for the y coordinate used to obtain an estimate of the y coordinate of the true position in accordance with operations 1120, 1130 and 1140.

The digital control electronics 236 may process or filter the improved estimate of the stylus's true position to generate a final position for the stylus that can then be passed to higher-level application software for further processing (1150). For example, the digital control electronics 236 may perform processing or filtering of the improved estimate that may include reducing the effects of temporal noise by temporal averaging of the improved estimate with the improved estimates or reported positions generated in a predetermined number of previous sensor frames (e.g., one or two frames when the stylus is moving quickly, or tens of frames when the stylus is moving slowly, for typical frame rates of approximately 100 Hz).

The digital control electronics 236 may report the final position to higher-level applications for further processing (1160). For example, the digital control electronics 236 may enable the reported position to be accessed by or otherwise provided to a pen drawing application that enables a user to use the stylus to draw pictures or write on a touch screen of the system 200.

Modifying the Stylus to Provide Additional Input Data to the Interpolation Function In some implementations, the stylus 220 may be constructed with a single-piece electrode. FIG. 12A shows an example 1210 of a single-piece electrode for the stylus 220. In other implementations, the stylus 220 may be constructed with multiple tip electrodes, to provide additional input data to the interpolation function.

FIG. 12B shows an example 1220 of an electrode for the stylus 220 that is split into two rotationally symmetric pieces. By splitting the electrode of the stylus 220 into two rotationally symmetric pieces, it is possible to measure the positions and angles (x, y, A, B) of the stylus 220 with less integral or differential error than is possible when using a single-piece electrode.

FIG. 12C shows an example 1230 of an electrode of the stylus 220 that is split into two rotationally asymmetric pieces. By splitting the electrode of the stylus 220 into two rotationally asymmetric pieces, it is possible to additionally measure a third angle corresponding to twist about the axis of the stylus.

An electrode may be split in to multiple pieces, and we may measure the capacitance from each row and column to each piece of the electrode; so in a system with m rows and n columns, and a two-piece electrode, we may measure $2*(m+n)$ capacitances. By superposition, the sum of the capacitances of each piece of the electrode to a given row or column must be equal to the capacitance from an equivalent single-piece electrode consisting of the Boolean union of both pieces to that row or column. The capacitances measured on the two-piece electrode must, therefore, contain at least as much information as the capacitances measured on an equivalent single-piece electrode, and an interpolation function written in terms of those capacitances must therefore perform at least as well for the two-piece electrode as for the single-piece electrode.

For some geometries, it may be found when the curve fit is performed to establish the interpolation function that the two-piece electrode provides additional useful information, for example that the resulting interpolation function provides a better fit to the data used to determine it, or that the resulting interpolation function is less sensitive to noise (i.e., reports less noise on its output position x or y, for a given amplitude of noise on its input parameter capacitances). In general, it may be difficult to predict the improvement in quality of the reported position (or angle, or other output quantity) in terms of any closed form analysis. To evaluate a particular electrode design, it may be necessary to construct (or simulate numerically in a field solver) such a prototype, measure the capacitance from each row and each column of a sensor matrix to each piece of the electrode, at a range of positions and orientations, and perform a curve fit of those data to a function of those capacitances.

Notably, the described implementations have focused on capacitive touch sensors that use capacitance data to identify the location of the stylus. The disclosed techniques, however, also may be used for touch sensors having other types of sensing technology (e.g., frustrated total internal reflection technology) and that produce other types of sensor data to identify the location of the stylus.

Some of the described implementations of the subject matter and the operations can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. The data processing apparatus may include the sensor, may be part of the sensor, may be a part of a system with the sensor, may be integrated within the system and/or sensor, may be part of receivers, transmitters, components and/or logic associated with the sensor or the receivers and/or transmitters, or any combination thereof. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

Various apparatuses, devices, and machines for processing data, may be used as a "data processing apparatus," including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. A human finger, for example, can interact with a touch screen to impact an amount of screen real estate. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be useful.

The invention claimed is:

1. A system comprising:
a test apparatus comprising a stylus that is configured to be positioned on a sensor matrix to enable the stylus to be automatically positioned at each location of a set of known locations on the sensor matrix; and
one or more processors configured to:
access the touch sensor data corresponding to the set of known locations on the sensor matrix, the touch sensor data produced in response to the test apparatus positioning the stylus on the sensor matrix at the set of known locations;
access stylus location data reflecting the set of known locations;
determine multiple different stylus position interpolation functions for each axis of the sensor matrix to produce multiple different estimates of a position of the stylus alone each axis of the sensor matrix by curve fitting based on the touch sensor data corresponding to the set of known locations and the stylus location data reflecting the set of known locations; and
combine the multiple different estimates to provide an estimate of a true position of the stylus alone each axis of the sensor matrix.

2. The system of claim 1, wherein the one or more processors are further configured to evaluate the stylus position interpolation functions to produce a reported position of the stylus alone each axis of the sensor matrix.

3. The system of claim 1, wherein the touch sensor data comprises measured capacitance data including a maximum observed capacitance, and the one or more processors are further configured to determine the stylus position interpolation function by normalizing the maximum observed capacitance to 1.

4. The system of claim 1, wherein the stylus position interpolation functions do not include a static offset that is dependent upon an angle of the stylus with respect to the sensor matrix.

5. The system of claim 1, wherein the stylus position interpolation functions include a static offset that is dependent upon an angle of the stylus with respect to the sensor matrix.

6. The system of claim 1, wherein the one or more processors are further configured to determine the stylus position interpolation function by adding one or more differential nonlinearity penalties to minimize a quantity proportional to a non-smoothness of the function.

7. The system of claim 1, wherein the one or more processors are further configured to determine the stylus position interpolation function by adding one or more penalties that seek to minimize a sum of squares of partial derivatives of the function with respect to each input variable at each measured point, to thereby decrease noise sensitivity of the function.

8. A method for determining an interpolation function for a stylus position on a sensor matrix, the method comprising:
  accessing touch sensor data corresponding to a set of known locations on a sensor matrix, the touch sensor data produced in response to positioning a stylus on the sensor matrix at a known orientation at each location of the set of known locations;
  accessing stylus location data reflecting the set of known locations;
  accessing stylus angular orientation data reflecting corresponding known angular orientations of the stylus at the known locations;
  determining multiple different stylus position interpolation functions for each axis of the sensor matrix to produce multiple different estimates of a position of the stylus alone each axis of the sensor matrix by curve fitting based on the touch sensor data corresponding to the set of known locations, the stylus location data reflecting the set of known locations, and the stylus angular orientation data reflecting the corresponding known angular orientations of the stylus at the known locations; and
  combining the multiple different estimates to provide an estimate of a true position of the stylus along each axis of the sensor matrix.

9. The method of claim 8, further comprising evaluating the stylus position interpolation functions to produce a reported position of the stylus.

10. The method of claim 8, wherein determining the stylus position interpolation function further comprises adding one or more differential nonlinearity penalties to minimize a quantity proportional to a non-smoothness of the function.

11. The method of claim 8, wherein determining the stylus position interpolation function further comprises adding one or more penalties that seek to minimize a sum of squares of partial derivatives of the function with respect to each input variable at each measured point, to thereby decrease noise sensitivity of the function.

12. A method for estimating a position of a stylus on a sensor matrix of a touch-sensitive system using a plurality of stylus position interpolation functions, the method comprising:
  accessing touch sensor data produced by a sensor matrix of the touch-sensitive system in response to the stylus engaging the sensor matrix at a first location;
  accessing a first stylus position interpolation function;
  calculating a first estimate of the first location by evaluating the first interpolation function using at least a first portion of the accessed touch sensor data;
  accessing a second stylus position interpolation function that is different from the first stylus position interpolation function;
  calculating a second estimate of the first location by evaluating the second interpolation function using at least a second portion of the accessed touch sensor data;
  calculating an improved estimate of the first location by mathematically combining the first estimate and the second estimate; and
  storing the improved estimate in a data store.

13. The method of claim 12, wherein calculating the first estimate further comprises calculating the first estimate for a current sensor frame, calculating the second estimate further comprises calculating a plurality of second estimates corresponding to a plurality of sensor frames within a window of time, and calculating the improved estimate further comprises mathematically combining the first estimate with an average of the plurality of second estimates.

14. The method of claim 12, wherein:
  calculating the first estimate further comprises calculating the first estimate for a current sensor frame, calculating a plurality of other first estimates corresponding to a first plurality of sensor frames within a first window of time, and combining the first estimate with an average of the other first estimates to yield a combined first estimate;
  calculating the second estimate further comprises calculating a plurality of second estimates corresponding to a second plurality of sensor frames within a second window of time; and
  calculating the improved estimate further comprises mathematically combining the combined first estimate with an average of the plurality of second estimates.

15. The method of claim 12, further comprising:
  calculating an estimated static offset; and
  adjusting the first estimate by the estimated static offset.

16. The method of claim 12, wherein the second portion and the first portion are a same portion.

17. The method of claim 12, further comprising:
  providing a stylus comprising an electrode split into a plurality of pieces;
  accessing a stylus angle interpolation function;
  calculating an estimate of a stylus angle by evaluating the stylus angle interpolation function using at least a third portion of the accessed touch sensor data; and
  utilizing the estimate of the stylus angle in calculating one or more of the first estimate and the second estimate.

* * * * *